US012795071B2

(12) United States Patent
Hashimoto et al.

(10) Patent No.: US 12,795,071 B2
(45) Date of Patent: Nov. 10, 2026

(54) VIDEO DECODING APPARATUS

(71) Applicant: SHARP KABUSHIKI KAISHA, Sakai City (JP)

(72) Inventors: Tomonori Hashimoto, Sakai City (JP); Tomoko Aono, Sakai City (JP); Tomohiro Ikai, Sakai City (JP); Yukinobu Yasugi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 73 days.

(21) Appl. No.: 18/876,257

(22) PCT Filed: Jun. 20, 2023

(86) PCT No.: PCT/JP2023/022727
§ 371 (c)(1),
(2) Date: Dec. 18, 2024

(87) PCT Pub. No.: WO2023/249006
PCT Pub. Date: Dec. 28, 2023

(65) Prior Publication Data
US 2026/0270393 A1 Sep. 10, 2026

(30) Foreign Application Priority Data
Jun. 24, 2022 (JP) ................................ 2022-1016747

(51) Int. Cl.
*H04N 19/52* (2014.01)
*H04N 19/105* (2014.01)
(Continued)

(52) U.S. Cl.
CPC ......... *H04N 19/105* (2014.11); *H04N 19/139* (2014.11); *H04N 19/52* (2014.11); *H04N 19/56* (2014.11)

(58) Field of Classification Search
CPC ...... H04N 19/52; H04N 19/56; H04N 19/105; H04N 19/139
See application file for complete search history.

(56) References Cited

U.S. PATENT DOCUMENTS 11,412,243 B2 * 8/2022 Chujoh ................ H04N 19/105
12,034,951 B2 * 7/2024 Chujoh ................ H04N 19/105
(Continued)

FOREIGN PATENT DOCUMENTS

EP 3301918 A1 4/2018
WO 2020182140 A1 9/2020

OTHER PUBLICATIONS

"T-REC-H.266 Versatile Video coding"—ver-1—2020. (Year: 2020).*
(Continued)

*Primary Examiner* — Luis Perez-Fuentes
(74) *Attorney, Agent, or Firm* — ScienBiziP, P.C.

(57) ABSTRACT

Video coding and/or decoding apparatuses that can enhance coding efficiency are provided. A video decoding apparatus includes an MMVD prediction unit configured to obtain a motion vector by adding a difference vector at a prescribed distance and in a prescribed direction to a predicted motion vector of a target block, and a parameter decoder configured to decode an index for indicating a difference vector from an MMVD candidate list, wherein the MMVD prediction unit derives a difference vector at a specific distance and in a specific direction from the prescribed distance and the prescribed direction, performs a search by deriving a template matching cost for the difference vector, and derives the MMVD candidate list by interpolating a difference vector candidate according to the template matching cost, and in the search, only a subset of a first direction is searched at a distance included in a prescribed distance set, and only a subset of a second direction is searched at a distance
(Continued)

included in a distance set other than the prescribed distance set.

8 Claims, 17 Drawing Sheets

(51) Int. Cl.

| | |
|---|---|
| ***H04N 19/139*** | (2014.01) |
| ***H04N 19/56*** | (2014.01) |

(56) References Cited

U.S. PATENT DOCUMENTS

| | | | | |
|---|---|---|---|---|
| 12,075,060 | B2 * | 8/2024 | Chen .................... | H04N 19/105 |
| 12,355,997 | B2 * | 7/2025 | Chujoh ................ | H04N 19/105 |
| 12,464,134 | B2 * | 11/2025 | Chen .................... | H04N 19/105 |
| 2021/0227250 | A1 | 7/2021 | Liu et al. | |

OTHER PUBLICATIONS

"Template Matching-based Reordering for Extended MMVD Design", Oct. 2021. (Year: 2021).*

Mehdi Salehifar et al., "Non-EE2: Template Matching-based Reordering for Extended MMVD Design", Document: JVET-X0085-v4, Joint Video Experts Team (JVET) of ITU-T SG 16 WP 3 and ISO/IEC JTC 1/SC 29 24th Meeting, by teleconference, Oct. 6-15, 2021.

Chuan Zhou et al., "Non-EE2: MVP refinement for regular AMVP mode", Document: JVET-Y0091-v1, Joint Video Experts Team (JVET) of ITU-T SG 16 WP 3 and ISO/IEC JTC 1/SC 29 25th Meeting, by teleconference, Jan. 12-21, 2022.

* cited by examiner (a)

| mmvd_cand_idx | 0 | 1 |
|---|---|---|
| Nth MVP | 1st MVP | 2nd MVP |

(b)

{A1, B1, B0, A0, B2}

(c) DistanceTable

| mmvd_distance_idx | 0 | 1 | 2 | 3 | 4 | 5 | 6 | 7 |
|---|---|---|---|---|---|---|---|---|
| MmvdDistance | 1 | 2 | 4 | 8 | 16 | 32 | 64 | 128 |

(d) DirectionTable

| mmvd_direction_idx | mvdUnit[0] | mvdUnit[1] |
|---|---|---|
| 0 | +1 | 0 |
| 1 | −1 | 0 |
| 2 | 0 | +1 |
| 3 | 0 | −1 |

| merge_data( x0, y0, cbWidth, cbHeight, chType ) { | **Descriptor** |
|---|---|
| if( CuPredMode[ chType ][ x0 ][ y0 ] = = MODE_IBC ) { | |
| if( MaxNumIbcMergeCand > 1 ) | |
| **merge_idx**[ x0 ][ y0 ] | ae(v) |
| } else { | |
| if( MaxNumSubblockMergeCand > 0 && cbWidth >= 8 && cbHeight >= 8 ) | |
| **merge_subblock_flag**[ x0 ][ y0 ] | ae(v) |
| if( merge_subblock_flag[ x0 ][ y0 ] = = 1 ) { | |
| if( MaxNumSubblockMergeCand > 1 ) | |
| **merge_subblock_idx**[ x0 ][ y0 ] | ae(v) |
| } else { | |
| if( cbWidth < 128 && cbHeight < 128 && ( ( sps_ciip_enabled_flag && cu_skip_flag[ x0 ][ y0 ] = = 0 && ( cbWidth * cbHeight ) >= 64 ) \|\| ( sps_gpm_enabled_flag && sh_slice_type = = B && cbWidth >= 8 && cbHeight >= 8 && cbWidth < ( 8 * cbHeight ) && cbHeight < ( 8 * cbWidth ) ) ) ) | |
| **regular_merge_flag**[ x0 ][ y0 ] | ae(v) |
| if( regular_merge_flag[ x0 ][ y0 ] = = 1 ) { | |
| if( sps_mmvd_enabled_flag ) | |
| **mmvd_merge_flag**[ x0 ][ y0 ] | ae(v) |
| if( mmvd_merge_flag[ x0 ][ y0 ] = = 1 ) { | |
| if( MaxNumMergeCand > 1 ) | |
| **mmvd_cand_flag**[ x0 ][ y0 ] | ae(v) |
| **mmvd_distance_idx**[ x0 ][ y0 ] | ae(v) |
| **mmvd_direction_idx**[ x0 ][ y0 ] | ae(v) |
| } else if( MaxNumMergeCand > 1 ) | |
| **merge_idx**[ x0 ][ y0 ] | ae(v) |
| } else { | |
| if( sps_ciip_enabled_flag && sps_gpm_enabled_flag && sh_slice_type = = B && cu_skip_flag[ x0 ][ y0 ] = = 0 && cbWidth >= 8 && cbHeight >= 8 && cbWidth < ( 8 * cbHeight ) && cbHeight < ( 8 * cbWidth ) && cbWidth < 128 && cbHeight < 128 ) | |
| **ciip_flag**[ x0 ][ y0 ] | ae(v) |
| if( ciip_flag[ x0 ][ y0 ] && MaxNumMergeCand > 1 ) | |
| **merge_idx**[ x0 ][ y0 ] | ae(v) |
| if( !ciip_flag[ x0 ][ y0 ] ) { | |
| **merge_gpm_partition_idx**[ x0 ][ y0 ] | ae(v) |
| **merge_gpm_idx0**[ x0 ][ y0 ] | ae(v) |
| if( MaxNumGpmMergeCand > 2 ) | |
| **merge_gpm_idx1**[ x0 ][ y0 ] | ae(v) |
| ... | |
| } | |

FIG. 9

| merge_data( x0, y0, cbWidth, cbHeight, chType ) { | **Descriptor** |
|---|---|
| if( CuPredMode[ chType ][ x0 ][ y0 ] = = MODE_IBC ) { | |
| if( MaxNumIbcMergeCand > 1 ) | |
| **merge_idx**[ x0 ][ y0 ] | ae(v) |
| ... | |
| **regular_merge_flag**[ x0 ][ y0 ] | ae(v) |
| if( regular_merge_flag[ x0 ][ y0 ] = = 1 ) { | |
| if( sps_mmvd_enabled_flag ) | |
| **mmvd_merge_flag**[ x0 ][ y0 ] | ae(v) |
| if( mmvd_merge_flag[ x0 ][ y0 ] = = 1 ) { | |
| if( MaxNumMergeCand > 1 ) | |
| **mmvd_cand_flag**[ x0 ][ y0 ] | ae(v) |
| **mmvd_cand_idx**[ x0 ][ y0 ] | ae(v) |
| } else if( MaxNumMergeCand > 1 ) | |
| **merge_idx**[ x0 ][ y0 ] | ae(v) |
| ... | |
| } | |

FIG. 10

| dir | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| x-axis | +1 | -1 | 0 | 0 | +1 | -1 | +1 | -1 | +2 | -2 | +2 | -2 | +1 | +1 | -1 | -1 |
| y-axis | 0 | 0 | +1 | -1 | +1 | -1 | -1 | +1 | +1 | +1 | -1 | -1 | +2 | -2 | +2 | -2 |

VIDEO DECODING APPARATUS

TECHNICAL FIELD

Embodiments of the present invention relate to a video decoding apparatus and the like. This application claims priority based on JP 2022-101647 filed in Japan on Jun. 24, 2022, the content of which is incorporated herein.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, Coding Units (CUs) obtained by splitting a coding tree unit, and Transform Units (TUs) obtained by splitting a coding unit, and are coded/decoded for each CU.

In such a video coding scheme, usually, a prediction image is generated based on a locally decoded image that is obtained by coding/decoding an input image, and a prediction error (which may be referred to also as a "difference image" or a "residual image") obtained by subtracting the prediction image from the input image (source image) is coded. Generation methods of prediction images include inter picture prediction (inter prediction) and intra picture prediction (intra prediction).

In addition, VVC/H.266 discloses MMVD prediction in which a motion vector is obtained by adding to a motion vector a difference vector at a prescribed distance and in a prescribed direction.

Moreover, NPL 1 discloses a technique for deriving a difference vector with a small code amount by calculating template matching costs for all MMVD difference vector candidates and sorting the MMVD difference vector candidates according to the template matching costs.

CITATION LIST

Non Patent Literature

NPL 1: "Non-EE2: Template Matching-based Reordering for Extended MMVD Design", JVET-X0085, Joint Video Experts Team (JVET) of ITU-T SG 16 WP 3 and ISO/IEC JTC 1/SC29 24th Meeting, by teleconference

SUMMARY OF INVENTION

Technical Problem

In the method described in NPL 1, since the template matching costs are derived for all the MMVD difference vector candidates, a problem exists in that the calculation amount is large.

Solution to Problem

In order to solve the above problem, a video decoding apparatus according to an aspect of the present invention is a video decoding apparatus including an MMVD prediction unit configured to obtain a motion vector by adding a difference vector at a prescribed distance and in a prescribed direction to a predicted motion vector of a target block, and a parameter decoder configured to decode, from a coded data, an index for indicating a difference vector from an MMVD candidate list, wherein the MMVD prediction unit derives a difference vector at a specific distance and in a specific direction from the prescribed distance and the prescribed direction, performs a search by deriving a template matching cost for the difference vector, and derives the MMVD candidate list by interpolating a difference vector candidate according to the template matching cost, and in the search, only a subset (DIR1) of a first direction is searched at a prescribed distance, and only a subset (DIR2) of a second direction is searched at a distance other than the prescribed distance.

Advantageous Effects of Invention

According to an aspect of the present invention, a calculation amount to be required for MMVD prediction can be reduced in video coding and/or decoding processing.

BRIEF DESCRIPTION OF DRAWINGS

FIG. 7(*a*) is a diagram illustrating an example of an index mmvd_cand_idx indicating an MMVD candidate in an MMVD candidate list. FIG. 7(*b*) is a diagram illustrating an example of positions of blocks neighboring a target block. FIG. 7(*c*) is a diagram illustrating an example of mmvd_distance_idx. FIG. 7(*d*) is a diagram illustrating an example of mmvd_direction_idx.

FIG. 9 is a syntax diagram in merge prediction and MMVD prediction.

FIG. 10 is a syntax diagram related to another configuration of the MMVD prediction.

DESCRIPTION OF EMBODIMENTS

First Embodiment

Embodiments of the present invention will be described below with reference to the drawings.

Figure 1:
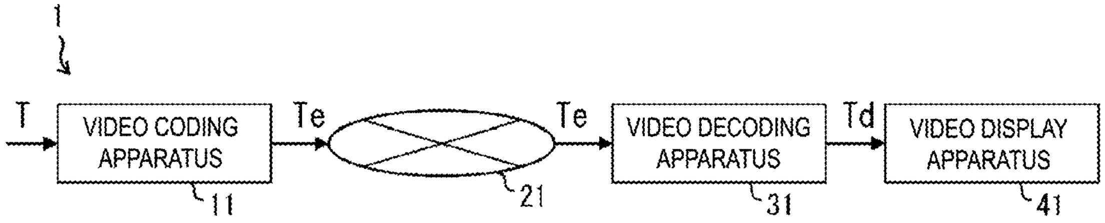
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not limited to a bi-directional communication network and may be a uni-directional communication network that transmits broadcast waves for terrestrial digital broadcasting, satellite broadcasting, or the like. The network 21 may be substituted by a storage medium in which the coding stream Te is recorded, such as a Digital Versatile Disc (DVD) (trade name) or a Blue-ray Disc (BD) (trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Examples of display types include a stationary or mobile type, and an HMD. In addition, in a case that the video decoding apparatus 31 has high processing capability, an image having high image quality is displayed, and in a case that the video decoding apparatus has lower processing capability, an image which does not require high processing capability and display capability is displayed.

Operators

Operators used in the present specification will be described below.

">>" indicates a right bit shift, "<<" indicates a left bit shift, "&" indicates a bitwise AND, "|" indicates a bitwise OR, "|=" indicates an OR assignment operator, and "||" indicates a logical sum.

x?y:z is a ternary operator that takes y in a case that x is true (other than 0) and takes z in a case that x is false(0).

Clip3(a, b, c) is a function to clip c in a value from a to b, and a function to return a in a case that c is smaller than a (c<a), return b in a case that c is greater than b (c>b), and return c in the other cases (provided that a is smaller than or equal to b (a<=b)).

abs(a) is a function that returns the absolute value of a.

Int(a) is a function that returns the integer value of a.

floor(a) is a function that returns the maximum integer equal to or smaller than a.

ceil(a) is a function that returns the minimum integer equal to or greater than a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
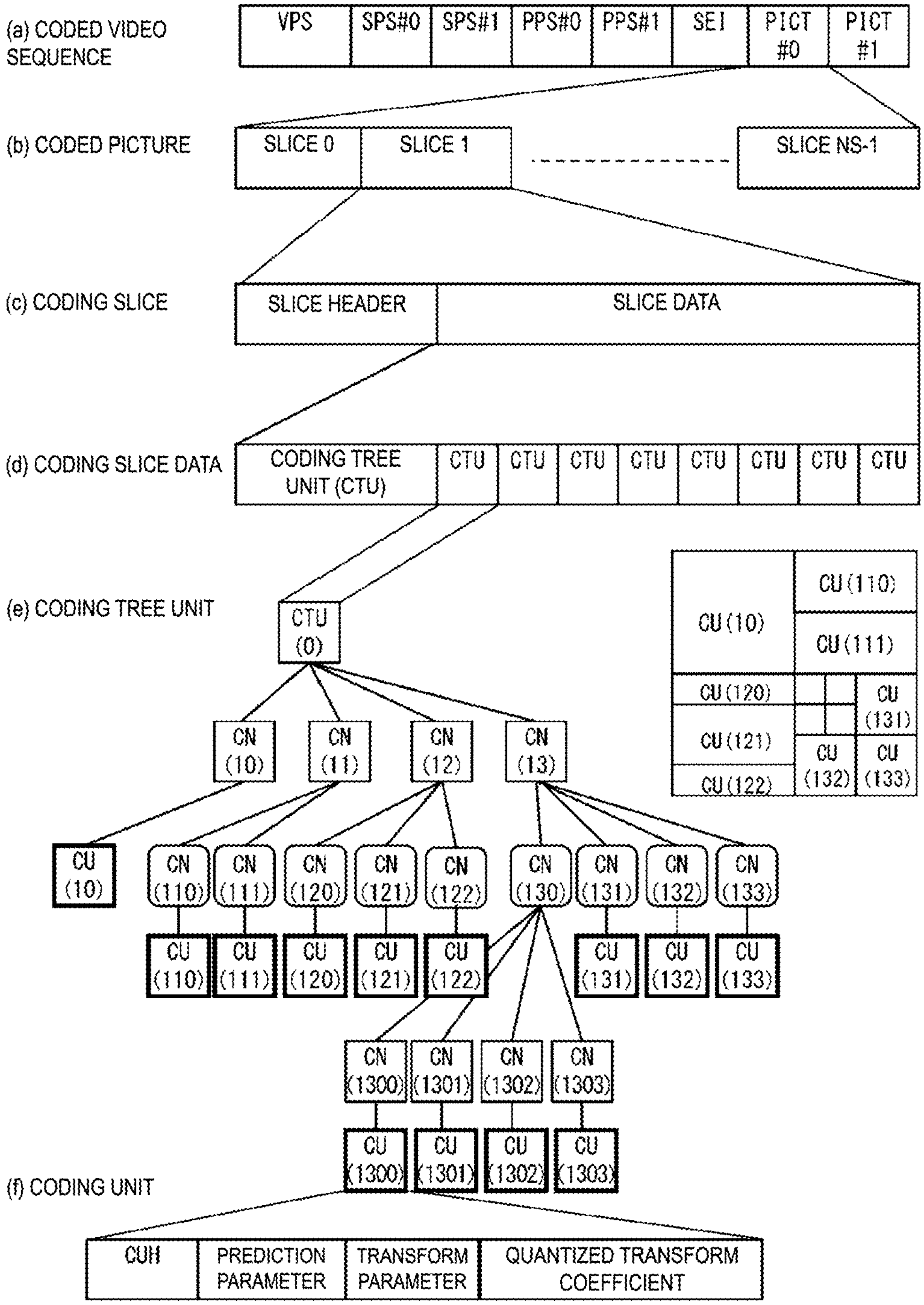
FIG. 2 is a diagram illustrating a hierarchical structure of data of a coding stream.

FIG. 2 is a diagram illustrating a hierarchical structure of data of the coding stream Te. The coding stream Te includes, as an example, a sequence and multiple pictures constituting the sequence. (a) to (f) of FIG. 2 are diagrams illustrating a coded video sequence predefining a sequence SEQ, a coded picture defining a picture PICT, a coding slice defining a slice S, a coding slice data defining slice data, a coding tree unit included in the coding slice data, and a coding unit included in the coding tree unit, respectively.

Coded Video Sequence

In the coded video sequence, a set of data referred to by the video decoding apparatus 31 to decode the sequence SEQ to be processed is defined. As illustrated in FIG. 2, the sequence SEQ includes a Video Parameter Set, Sequence Parameter Sets SPSs, Picture Parameter Sets PPSs, an Adaptation Parameter Set (APS), pictures PICTs, and Supplemental Enhancement Information SEI.

The video parameter set VPS defines, in a video including multiple layers, a set of coding parameters common to multiple videos and a set of coding parameters relating to multiple layers and individual layers included in the video.

In the sequence parameter sets SPSs, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter sets (PPS), a set of coding parameters that the video decoding apparatus 31 refers to in order to decode each picture in the target sequence is defined. For example, a PPS includes a reference value for a quantization step size used in picture decoding (pic_init_qp_minus26) and a flag indicating application of weighted prediction (weighted_pred_flag). Note that multiple PPSs may exist. In that case, any of the multiple PPSs is selected from each picture in a target sequence.

Coded Picture

In the coded picture, a set of data referred to by the video decoding apparatus 31 to decode a picture PICT to be processed is defined. The picture PICT includes a slice 0 to a slice NS-1 (NS is the total number of slices included in the picture PICT) as illustrated in FIG. 2.

Note that, in a case that it is not necessary to distinguish each of the slice 0 to the slice NS-1 below, numeric suffixes of reference signs may be omitted. In addition, the same applies to other data with suffixes included in the coding stream Te which will be described below.

Coding Slice

In each coding slice, a set of data referred to by the video decoding apparatus 31 to decode a slice S to be processed is defined. The slice includes a slice header and slice data as illustrated in FIG. 2.

The slice header includes a coding parameter group referred to by the video decoding apparatus 31 to determine a decoding method for a target slice. Slice type indication information (slice type) indicating a slice type is one example of a coding parameter included in the slice header.

Examples of slice types that can be indicated by the slice type indication information include (1) an I slice for which only intra prediction is used for coding, (2) a P slice for which uni-directional prediction or intra prediction is used for coding, (3) a B slice for which uni-directional prediction, bi-directional prediction, or intra prediction is used for coding. Note that the inter prediction is not limited to uni-prediction and bi-prediction, and a prediction image may be generated by using a larger number of reference pictures. Hereinafter, in a case of a slice being referred to as a P or B slice, it indicates a slice including a block in which inter prediction can be used.

Note that the slice header may include a reference to the picture parameter set PPS (pic_parameter_set_id).

Coding Slice Data

In coding slice data, a set of data referred to by the video decoding apparatus 31 to decode slice data to be processed is defined. The slice data includes CTUs as illustrated in FIG. 2(*d*). A CTU is a block in a fixed size (for example, 64×64) constituting a slice, and may also be called a Largest Coding Unit (LCU).

Coding Tree Unit

In FIG. 2, a set of data referenced by the video decoding apparatus 31 to decode a CTU to be processed is defined. The CTU is split into coding units CUs, each of which is a basic unit of coding processing, by a recursive Quad Tree (QT) split, Binary Tree (BT) split, or Ternary Tree (TT) split. The BT split and the TT split are collectively referred to as Multi Tree (MT) split. A node of a tree structure obtained by recursive quad tree split is referred to as a Coding Node. An intermediate node of a quad tree, a binary tree, and a ternary tree is a coding node, and a CTU itself is also defined as the highest coding node. The lowest coding node is defined as the coding unit.

Coding Unit

In FIG. 2, a set of data referenced by the video decoding apparatus 31 to decode a coding unit to be processed is defined. Specifically, a CU includes a CU header CUH, a prediction parameter, a transform parameter, a quantized transform coefficient, and the like. In the CU header, a prediction mode and the like are defined.

The prediction processing may be performed for each CU or performed for each sub-CU, the sub-CU being obtained by further splitting the CU. In a case that a CU and a sub-CU have an equal size, the number of sub-CUs in the CU is one. In a case that a CU has a size larger than that of a sub-CU, the CU is split into sub-CUs. For example, in a case that a CU has a size of 8×8, and a sub-CU has a size of 4×4, the CU is split into four sub-CUs which include two horizontal splits and two vertical splits.

Types of prediction (prediction mode) include intra prediction (MODE_INTRA), inter prediction (MODE_INTER), and an intra block copy (MODE_IBC). Intra prediction refers to prediction in the same picture, and inter prediction refers to prediction processing performed between different pictures (for example, between pictures of different display times, and between pictures of different layer images).

Although transform and quantization processing is performed for each CU, entropy coding of a quantized transform coefficient may be performed for each subblock such as 4×4.

Prediction Parameters

A prediction image is derived by prediction parameters associated with blocks. The prediction parameters include intra prediction and inter prediction parameters.

Prediction Parameters for Inter Prediction

The prediction parameters for inter prediction will be described. Inter prediction parameters include prediction list utilization flags predFlagL0 and predFlagL1, reference picture indices refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that, in a case that the present specification mentions "a flag indicating whether XX is applied", the flag indicating a value other than 0 (for example, 1) means a case where XX is applied, and the flag indicating 0 means a case where XX is not applied, and 1 is treated as true and 0 is treated as false in a logical negation, a logical product, and the like (hereinafter, the same applies). However, other values can be used for true values and false values in real apparatuses and methods.

Syntax elements for deriving inter prediction parameters include, for example, a merge flag merge_flag (general_merge_flag), merge indices merge_idx, merge_subblock_flag, regulare_merge_flag, ciip_flag, merge_gpm_partition_idx, merge_gpm_idx0, merge_gpm_idx1, and inter_pred_idc, reference picture indices refIdxLX, and mvp_LX_idx, difference vector mvdLX, and motion vector precision mode amvr_mode. merge_subblock_flag is a flag indicating whether to use inter prediction for each subblock. regulare_merge_flag is a flag indicating whether a regular merge mode or MMVD is used. ciip_flag is a flag indicating whether a combined inter-picture merge and intra-picture prediction (CIIP) mode is used or a geometric partitioning merge mode (GPM mode) is used. merge_gpm_partition_idx is an index indicating a division form of the GPM mode. merge_gpm_idx0 and merge_gpm_idx1 are indices indicating merge indices of the GPM mode. inter_pred_idc is an inter prediction indicator for selecting a reference picture that is used in an AMVP mode. mvp_LX_idx is a prediction vector index for deriving a motion vector.

Reference Picture List

A reference picture list is a list including reference pictures stored in a reference picture memory 306. For individual CUs, which picture in a reference picture list RefPicListX (X=0 or 1) is actually referred to is indicated with refIdxLX. Note that LX is a description method used in a case of not distinguishing L0 prediction and L1 prediction, and in the following description, distinguishes parameters for the L0 list and parameters for the L1 list by replacing LX with L0 and L1.

Merge Prediction and AMVP Prediction

A decoding (coding) method for prediction parameters includes a merge prediction (merge) mode (merge mode) and an Advanced Motion Vector Prediction (AMVP) mode, and general_merge_flag is a flag for identifying the modes. The merge mode is a prediction mode in which one or some, or all of motion vector differences are omitted, and a mode in which a prediction list utilization flag predFlagLX, a reference picture index refIdxLX, and a motion vector mvLX are derived from prediction parameters for neighboring blocks already processed, or the like, without being included in coded data. The AMVP mode is a mode in which inter_pred_idc, refIdxLX, and mvLX are included in the coded data. Note that mvLX is coded as mvp_LX_idx identifying a prediction vector mvpLX and a difference vector mvdLX. In addition, the prediction mode in which the motion vector difference is omitted or simplified is collectively called a general merge mode, and the general merge mode and the AMVP prediction may be selected by using general_merge_flag.

In a case that general_merge_flag is 1, merge_data( ), as illustrated in FIG. 10, may be transmitted and then, regular_merge_flag may be transmitted. In a case that regular_merge_flag is 1, the regular merge mode or the MMVD may be selected, and otherwise the CIP mode or the GPM mode may be selected. In the CIP mode, a prediction image is generated using a weighted sum of an inter prediction image and an intra prediction image. In the GPM mode, a prediction image is generated as two non-rectangular prediction units obtained by splitting a target CU along a line segment.

inter_pred_idc is a value indicating the types and number of reference pictures, and takes any value of PRED_L0, PRED_L1, or PRED_BI. PRED_L0 and PRED_L1 indicate uni-prediction which uses one reference picture managed in the L0 list and one reference picture managed in the L1 list, respectively. PRED_BI indicates bi-prediction which uses two reference pictures managed in the L0 list and the L1 list.

merge_idx is an index indicating which prediction parameter is used as a prediction parameter for a target block, among prediction parameter candidates (merge candidates) derived from process-completed blocks.

Motion Vector mvLX indicates a shift amount between blocks in two different pictures. A prediction vector and a difference vector related to mvLX are referred to as mvpLX and mvdLX, respectively.

Inter Prediction Indicator inter_pred_idc and Prediction List Utilization Flag predFlagLX Relationships between inter_pred_idc and predFlagL0 and predFlagL1 are as follows, and can be transformed into one another.

$$\text{inter\_pred\_idc} = (predFlagL1 \ll 1) + predFlagL0$$

$$predFlagL0 = \text{inter\_pred\_idc}\ \&1$$

$$predFlagL1 = \text{inter\_pred\_idc} \gg 1$$

Note that the inter prediction parameters may use a prediction list utilization flag or may use an inter prediction indicator. In addition, determination using a prediction list utilization flag may be replaced with determination using an inter prediction indicator. On the contrary, determination using an inter prediction indicator may be replaced with determination using a prediction list utilization flag.

Determination of Bi-Prediction biPred

A flag biPred for identifying bi-prediction can be derived from whether both of two prediction list utilization flags are 1.

Alternatively, biPred can be also derived from whether the inter prediction indicator is a value indicating the use of two prediction lists (reference pictures).

Configuration of Video Decoding Apparatus

Figure 3:
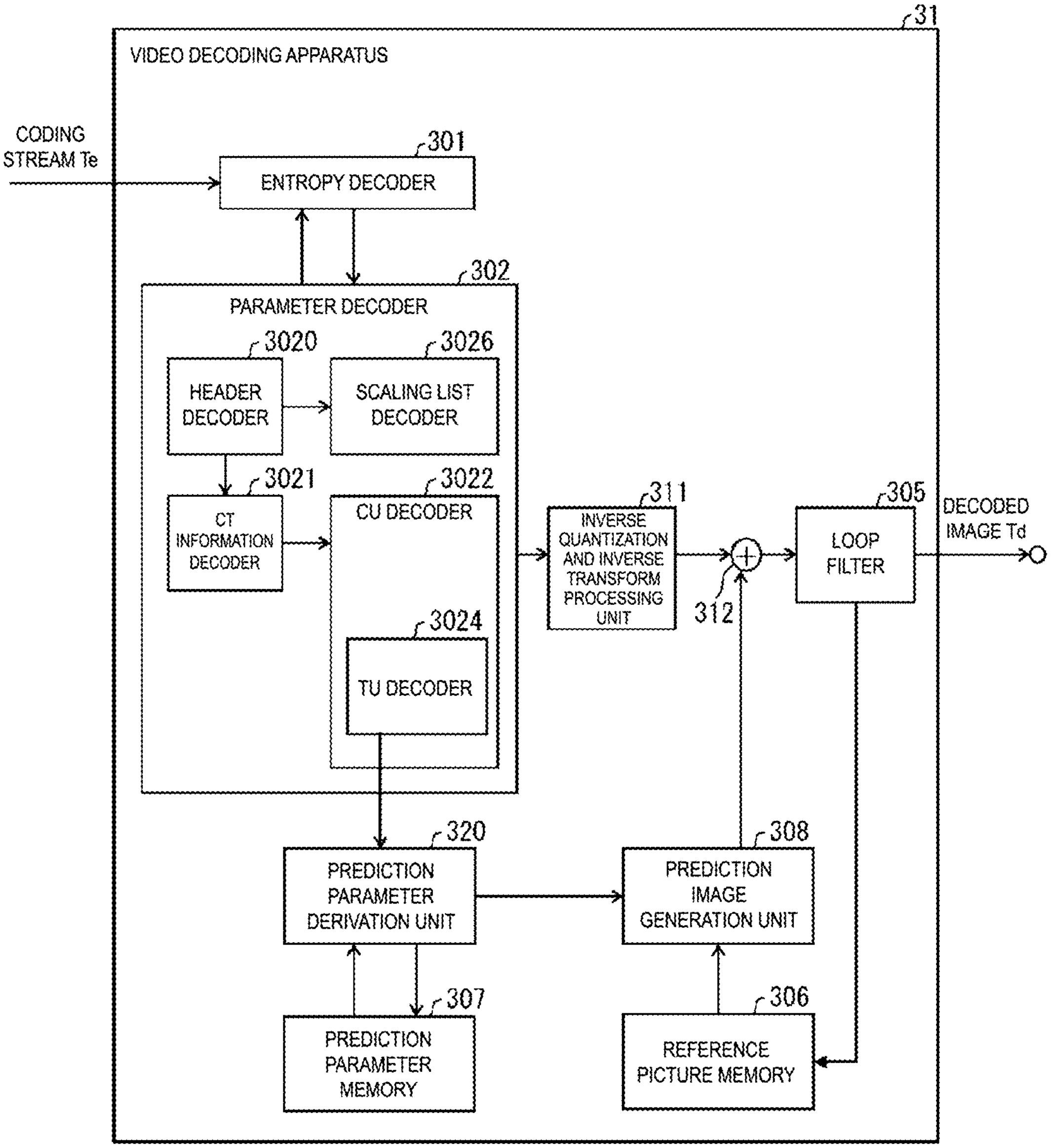
FIG. 3 is a schematic diagram illustrating a configuration of a video decoding apparatus.

A configuration of the video decoding apparatus 31 (FIG. 3) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the video decoding apparatus 31 may be used according to the video coding apparatus 11, which will be described below.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as a VPS, an SPS, a PPS, and an APS, and a slice header (slice information). The CT information decoder 3021 decodes a CT from coded data. The CU decoder 3022 decodes a CU from coded data. The TU decoder 3024 decodes a CU from coded data.

In a case that the TU includes a prediction error, the TU decoder 3024 decodes, from the coded data, QP update information and a quantized transform coefficient. Derivation of the quantized transform coefficient may involve multiple modes (for example, an RRC mode and a TSRC mode). Regular Residual Coding (RRC) is a decoding mode of a prediction error using transform, and Transform Skip Residual Coding (TSRC) is a decoding mode of a prediction error in a transform skip mode in which transform is not performed. In the RRC mode, the TU decoder 3024 may decode a LAST position of the transform coefficient, and in the TSRC mode, the TU decoder 3024 need not decode the LAST position. The QP update information is a difference value from a quantization parameter prediction value qPpred, which is a prediction value of a quantization parameter QP.

The prediction image generation unit 308 includes an inter prediction image generation unit 309 (FIG. 4) and an intra prediction image generation unit 310.

The prediction parameter derivation unit 320 includes an inter prediction parameter derivation unit 303 (FIG. 5) and an intra prediction parameter derivation unit.

In addition, although an example in which a CTU and a CU are used as a unit of processing will be described below, the unit of processing is not limited to this example, and processing may be performed for each sub-CU. Alternatively, the CTU or the CU may be referred to as a block, the sub-CU may be referred to as a subblock, and processing may be performed for each block or subblock.

The entropy decoder 301 performs entropy decoding on the coding stream Te input from the outside and decodes individual codes (syntax elements). The entropy coding includes a method in which variable-length coding of syntax elements is performed by using a context (probability model) adaptively selected according to a type of syntax element and a surrounding condition, and a method in which variable-length coding of syntax elements is performed by using a predetermined table or formula.

The entropy decoder 301 outputs the decoded codes to the parameter decoder 302. The decoded code is, for example, a prediction mode predMode, general_merge_flag, merge_idx, inter_pred_idc, refIdxLX, mvp_LX_idx, mvdLX, amvr_mode, and the like. Which code is to be decoded is controlled based on an indication of the parameter decoder 302.

Basic Flow

Figure 6:
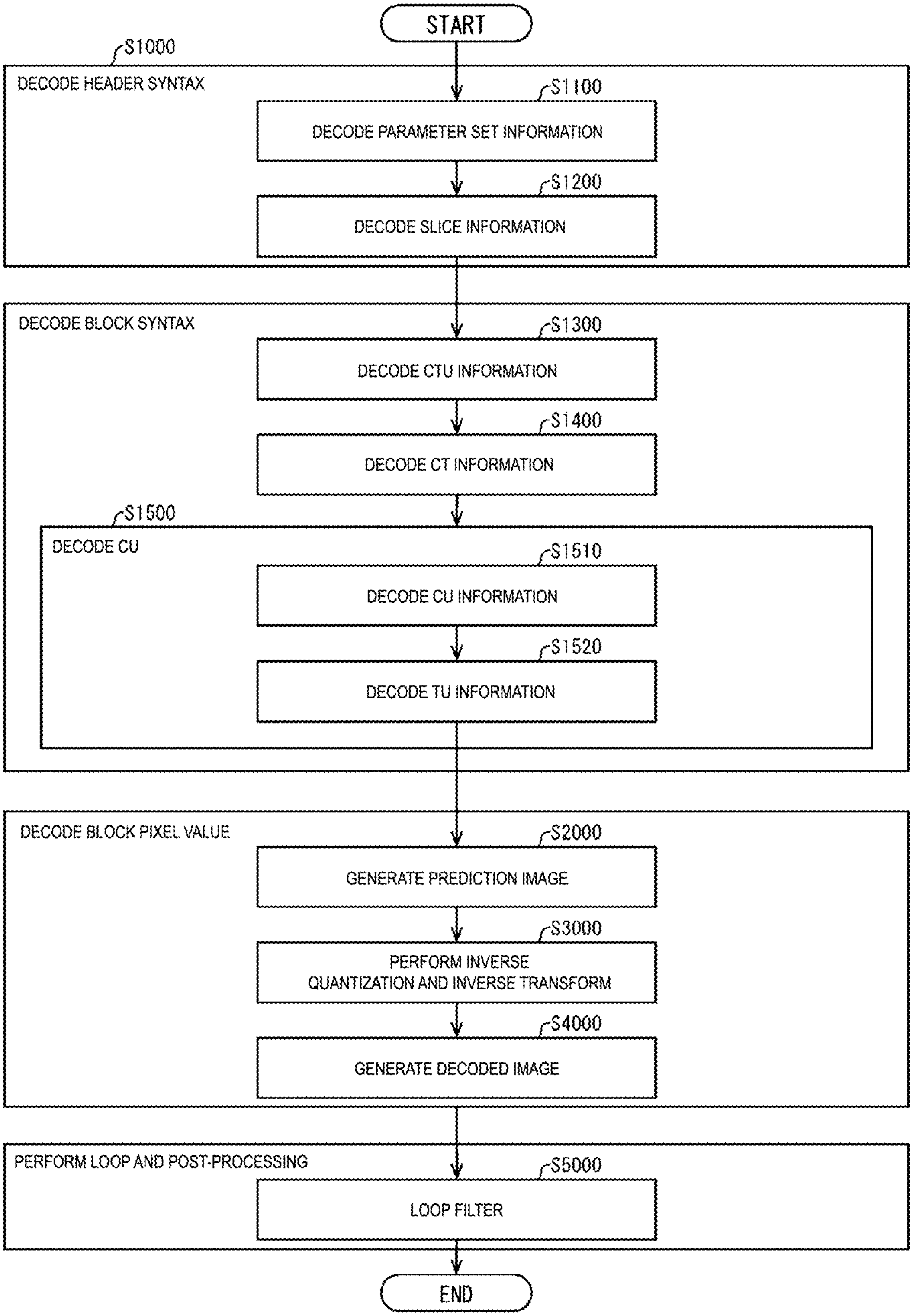
FIG. 6 is a flowchart illustrating general operation of the video decoding apparatus.

FIG. 6 is a flowchart illustrating general operation of the video decoding apparatus 31.

(S1100: Decoding of parameter set information) The header decoder 3020 decodes parameter set information such as a VPS, an SPS, and a PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a TU split flag, a CU residual flag, and the like from the coded data.

(S1520: Decoding of TU information) In a case that the TU includes a prediction error, the TU decoder 3024 decodes, from the coded data, a quantization prediction error, and the like.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

The loop filter 305 is a filter provided in the coding loop, and is a filter that removes block distortion and ringing distortion and improves image quality. The loop filter 305 applies a filter such as a deblocking filter, a sample adaptive offset (SAO), and an adaptive loop filter (ALF) to the decoded image of the CU generated by the addition unit 312.

The reference picture memory 306 stores the decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores the parameter decoded by the parameter decoder 302, the prediction mode predMode separated by the entropy decoder 301, and the like.

The prediction mode predMode, the prediction parameter, and the like are input to the prediction image generation unit 308. In addition, the prediction image generation unit 308 reads out a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to for generating a prediction image.

Configuration of Inter Prediction Parameter Derivation Unit

Figure 5:
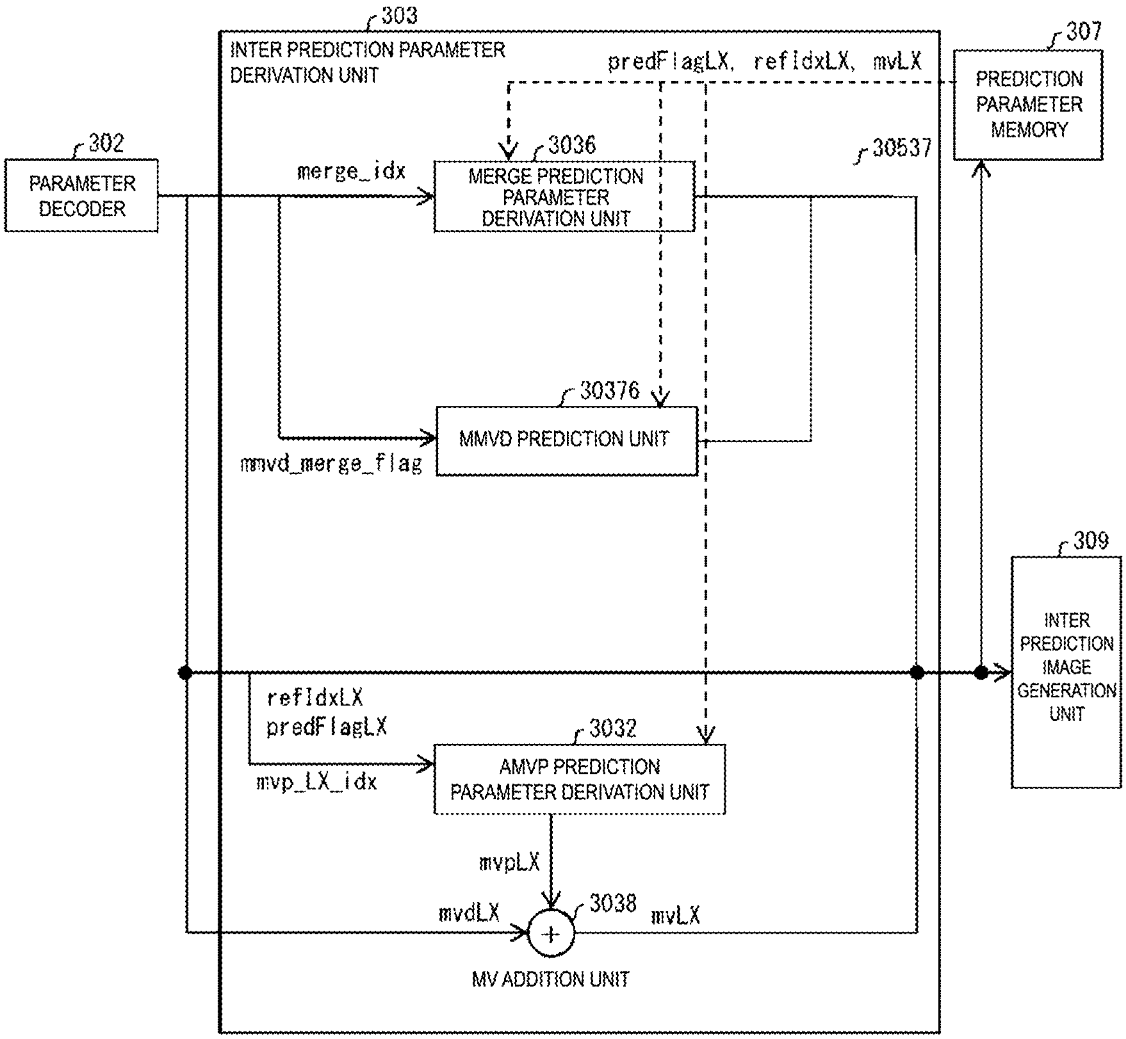
FIG. 5 is a schematic diagram illustrating a configuration of an inter prediction parameter derivation unit.

As illustrated in FIG. 5, the inter prediction parameter derivation unit 303 derives an inter prediction parameter with reference to the prediction parameters stored in the prediction parameter memory 307 based on the syntax elements input from the parameter decoder 302. In addition, the inter prediction parameter is output to the inter prediction image generation unit 309 and the prediction parameter memory 307. Since the inter prediction parameter derivation unit 303 and an AMVP prediction parameter derivation unit 3032, a merge prediction parameter derivation unit 3036, a GPM prediction unit 30377, and a MV addition unit 3038 serving as internal elements of the inter prediction parameter derivation unit 303 are means common to the video coding apparatus and the video decoding apparatus, they may be collectively referred to as a motion vector derivation unit (motion vector derivation apparatus).

In a case that general_merge_flag indicates 1, that is, the merge prediction mode, merge_idx is derived and output to the merge prediction parameter derivation unit 3036.

In a case that general_merge_flag indicates 0, that is, the AMVP prediction mode, the AMVP prediction parameter derivation unit 3032 derives mvpLX from inter_pred_idc, refIdxLX, or mvp_LX_idx.

MV Addition Unit

The MV addition unit 3038 adds derived mvpLX and mvdLX to derive mvLX.

Merge Prediction

The merge prediction parameter derivation unit 3036 includes a merge candidate derivation unit 30361 and a merge candidate selection unit 30362. Note that a merge candidate includes the prediction parameters (predFlagLX, mvLX, and refIdxLX) and is stored in a merge candidate list. The merge candidate stored in the merge candidate list has an index assigned in accordance with a prescribed rule.

The merge candidate derivation unit 30361 derives the merge candidate using the motion vector and refIdxLX for the decoded neighbouring block without any change. In addition, the merge candidate derivation unit 30361 may apply spatial merge candidate derivation processing, temporal merge candidate derivation processing, and the like, which will be described below.

Figure 7:
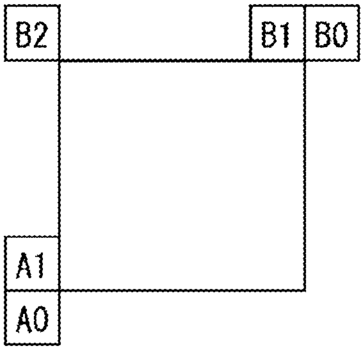
FIG. 7 is a diagram illustrating an example of an index used in an MMVD mode.

As the spatial merge candidate derivation processing, the merge candidate derivation unit 30361 reads the prediction parameter stored in the prediction parameter memory 307 in accordance with a prescribed rule, and sets the prediction parameter as a merge candidate. For example, as illustrated in FIG. 7(*b*), the prediction parameters at the positions of A1, B1, B0, A0, and B2, which will be described below, are read.

$$A1: (xCb-1,\ yCb+cbHeight-1)$$

$$B1: (xCb+cbWidth-1,\ yCb-1)$$

$$B0: (xCB+cbWidth,\ yCb-1)$$

$$A0: (xCb-1,\ yCb+cbHeight)$$

$$B2: (xCb-1,\ yCb-1)$$

The target block has top left coordinates (xCb, yCb), a width cbWidth, and a height cbHeight.

As temporal merge derivation processing, the merge candidate derivation unit 30361 may read, from the prediction parameter memory 307, the prediction parameter for a block C in the reference image including bottom right coordinates CBR or center coordinates of the target block, specify the block C as a merge candidate Col, and store the block C in a merge candidate list mergeCandList[ ].

The order of storage in mergeCandList[ ] is spatial merge candidates (B1, A1, B0, A0, and B2), and the temporal merge candidate Col. Note that a reference block that is not available (intra prediction block, or the like) is not stored in the merge candidate list.

$$i = 0$$
$$\text{if } (availableFlagB1)$$
$$mergeCandList[i{+}{+}] = B1$$
$$\text{if } (availableFlagA1)$$
$$mergeCandList[i{+}{+}] = A1$$
$$\text{if } (availableFlagB0)$$
$$mergeCandList[i{+}{+}] = B0$$
$$\text{if } (availableFlagA0)$$
$$mergeCandList[i{+}{+}] = A0$$
$$\text{if } (availableFlagB2)$$
$$mergeCandList[i{+}{+}] = B2$$
$$\text{if } (availableFlagCol)$$
$$mergeCandList[i{+}{+}] = Col$$

Furthermore, a history merge candidate HmvpCand, a pair-wise average candidate avgCand, and a zero merge candidate zeroCandm may be added to mergeCandList[ ] and used.

The merge candidate selection unit 30362 selects a merge candidate N indicated by merge_idx from the merge candidates included in the merge candidate list, in accordance with the equation below.

$$N = mergeCandList[\text{merge\_idx}]$$

Here, N is a label indicating a merge candidate, and takes A1, B1, B0, A0, B2, Col, and the like. The motion information of the merge candidate indicated by the label N is indicated by (mvLXN[0], mvLXN[1]), predFlagLXN, and refIdxLXN.

In accordance with merge_idx, (mvLXN[0], mvLXN[0]), predFlagLXN, and refIdxLXN are selected as inter prediction parameters for the target block. The merge candidate selection unit 30362 stores the inter prediction parameter for the selected merge candidate in the prediction parameter memory 307 and outputs the inter prediction parameter to the inter prediction image generation unit 309.

MMVD Prediction Unit 30376

Figure 8:
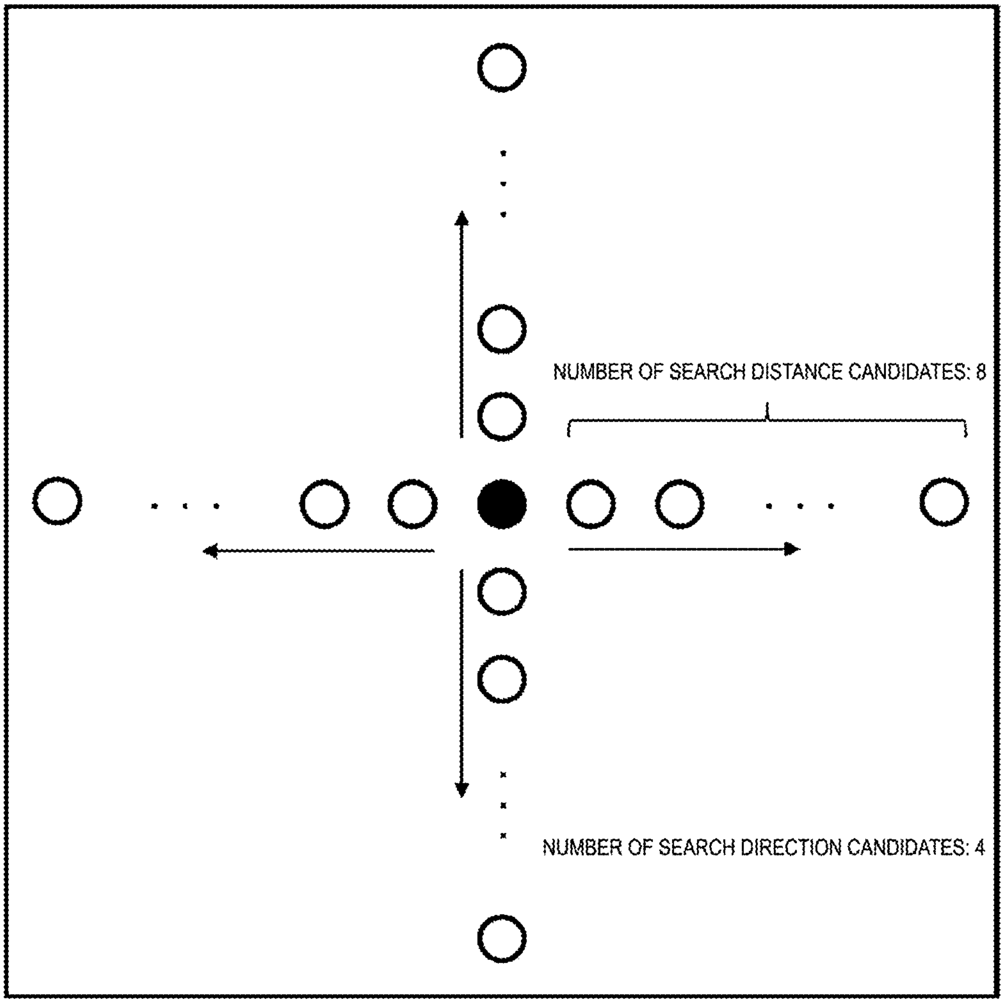
FIG. 8 is a diagram illustrating an example of the number of candidates for a search distance and the number of candidates for a derivation direction in the MMVD mode.

The MMVD prediction unit 30376 performs processing in a Merge with Motion Vector Difference (MMVD) mode. In the merge prediction, a motion vector obtained from a neighbouring block is used as a motion vector of a merge candidate. The MMVD mode is a mode in which a motion vector is obtained with high precision by adding a difference vector at a prescribed distance and in a prescribed direction to the motion vector of the merge candidate. In the MMVD mode, the MMVD prediction unit 30376 efficiently derives a motion vector by using the merge candidate and limiting the value range of the difference vector to prescribed distances (for example, six distances, eight distances, or the like) and prescribed directions (for example, four directions, eight directions, sixteen directions, or the like). FIG. 8 illustrates an example of four directions.

The MMVD prediction unit 30376 derives the motion vector mvLX[ ] by using the merge candidate mergeCandList[ ] and syntaxes mmvd_cand_flag, mmvd_direction_idx, and mmvd_distance_idx. These are syntaxes decoded from coded data or syntaxes coded into coded data. Furthermore, the MMVD prediction unit 30376 may code or decode a syntax distance_list_idx for selecting a distance table for use.

The MMVD prediction unit 30376 decodes the MMVD flag (mmvd_merge_flag) in a case that regular_merge_flag of the target CU is 1 (which indicates that the regular merge mode or MMVD mode is to be applied). Furthermore, in a case that the MMVD flag indicates that the MMVD mode is to be applied (mmvd_merge_flag=1), the MMVD prediction unit 30376 applies the MMVD mode, and codes or decodes mmvd_cand_flag, mmvd_distance_idx, and mmvd_direction_idx.

The MMVD prediction unit 30376 generates the MMVD candidate list and derives the motion vector by using the prediction vector of any one of two candidates from the beginning of the merge candidate list mergeCandList[ ] and a difference vector (motion vector difference (MVD)) from the prediction vector of the selected candidates. The difference vector is coded or decoded separately for each direction and each distance. Furthermore, the MMVD prediction unit 30376 derives the motion vector from the prediction vector and the difference vector.

FIG. 8 illustrates candidates for the difference vector refineMvLX derived in the MMVD prediction unit 30376. In the example illustrated in the figure, a central solid circle is a location indicated by the prediction vector mvLXN (central vector).

FIG. 7(*a*) illustrates a relationship between the index mmvd_cand_flag of mergeCandList[ ] and mvLXN. The motion vector of mergeCandList[mmvd_cand_flag] is set in mvLXN. The difference between the location (solid circle in FIG. 8) indicated by the central vector and the actual motion vector is the difference vector refineMvLX.

FIG. 7(*b*) is a diagram illustrating an example of blocks neighboring a target block. For example, in a case of mergeCandList[ ]={A1, B1, B0, A0, B2} and in a case that mmvd_cand_flag decoded indicates 0, the MMVD prediction unit 30376 selects the motion vector of a block A1 illustrated in FIG. 7(*b*) as the central vector mvLXN. Further, in a case that mmvd_cand_flag decoded indicates 1, the MMVD prediction unit 30376 selects the motion vector of a block B1 illustrated in FIG. 7(*b*) as the central vector mvLXN. Note that in a case that mmvd_cand_flag is not signaled in the coded data, mmvd_cand_flag=0 may be inferred.

Additionally, the MMVD prediction unit 30376 derives refineMvLX by using the index mmvd_distance_idx indicating a length of the difference vector refineMvLX and the index mmvd_direction_idx indicating a direction of refineMvLX.

FIG. 7(*c*) is a diagram illustrating an example of mmvd_distance_idx. As illustrated in FIG. 7(*c*), values of 0, 1, 2, 3, 4, 5, 6, and 7 in mmvd_distance_idx respectively correspond to eight distances (lengths) of ¼ pel, ½ pel, 1 pel, 2 pel, 4 pel, 8 pel, 16 pel, and 32 pel.

FIG. 7(*d*) is a diagram illustrating an example of mmvd_direction_idx. As illustrated in FIG. 7(*d*), the values of 0, 1, 2, and 3 in mmvd_direction_idx respectively correspond to the direction of a positive x axis, the direction of a negative x axis, the direction of a positive y axis, and the direction of a negative y axis. The MMVD prediction unit 30376 derives a base motion vector (mvdUnit[0], mvdUnit[1]) from mmvd_direction_idx with reference to a direction table DirectionTable. (mvdUnit[0], mvdUnit[1]) may also be described as (sign[0], sign[1]).

Additionally, the MMVD prediction unit 30376 derives a magnitude DistFromBaseMV (which is equal to MmvdDistance) of a difference vector, from the distance DistanceTable[mmvd_distance_idx] indicated by mmvd_distance_idx in the distance table DistanceTable, by using the following equation.

$$DistFromBaseMV = DistanceTable[\text{mmvd\_distance\_idx}]$$

In addition, DistanceTable may be selected from the following two expressions according to the flag.

$$DistanceTable[] = \{1, 2, 4, 8, 16, 32, 64, 128\}$$

$$DistanceTable[] = \{4, 8, 16, 32, 64, 128, 256, 512\}$$

In addition, the magnitude of the central vector and the magnitude of the difference vector may be matched by a left shift in consideration of the precision (for example, 1/16) of the motion vector.

$$DistFromBaseMV = DistFromBaseMV \ll 2$$

Cases Other than Four Directions

In the above description, a case has been described in which the base motion vector (mvdUnit[0], mvdUnit[1]) is present in four directions including upward, downward, leftward, and rightward directions. While not being limited to the four directions, eight directions may be allowed. Examples of an x component dir_table_x[ ] and a y component dir_table_y[ ] of the direction table DirectionTable in which the base motion vector is present in eight directions will be described below.

$$\text{dir\_table\_x}[] = \{8, -8, 0, 0, 6, -6, -6, 6\}$$

$$\text{dir\_table\_y}[] = \{0, 0, 8, -8, 6, -6, 6, -6\}$$

Note that the size of the direction table and the order of elements in the direction table may be other than those described above.

The MMVD prediction unit 30376 derives the base motion vector (mvdUnit[0], mvdUnit[1]) with reference to DirectionTable based on mmvd_direction_idx.

$$mvdUnit[0] = \text{dir\_table\_x}[\text{mmvd\_direction\_idx}]$$

$$mvdUnit[1] = \text{dir\_table\_y}[\text{mmvd\_direction\_idx}]$$

Additionally, four, six, twelve, or sixteen directions may be used, for example, by using the following direction tables.

In a case of six directions (numDir=6)

$$\text{dir\_table\_x}[] = \{8, -8, 2, -2, -2, 2\}$$

$$\text{dir\_table\_y}[] = \{0, 0, 4, -4, 4, -4\}$$

or $$\text{dir\_table\_x}[] = \{8, -8, 3, -3, -3, 3\}$$

$$\text{dir\_table\_y}[] = \{0, 0, 6, -6, 6, -6\}$$

In a case of twelve directions (numDir=12)

$$\text{dir\_table\_x}[] = \{8, -8, 0, 0, 4, 2, -4, -2, -2, -4, 2, 4\}$$

$$\text{dir\_table\_y}[] = \{0, 0, 8, -8, 2, 4, -2, -4, 4, 2, -4, -2\}$$

or $$\text{dir\_table\_x}[] = \{8, -8, 0, 0, 6, 3, -6, -3, -3, -6, 3, 6\}$$

$$\text{dir\_table\_y}[] = \{0, 0, 8, -8, 3, 6, -3, -6, 6, 3, -6, -3\}$$

In a case of sixteen directions (numDir=16)

$$\text{dir\_table\_x}[] = \{8, -8, 0, 0, 4, -4, -4, 4, 6, 2, -6, -2, -2, -6, 2, 6\}$$

$$\text{dir\_table\_y}[] = \{0, 0, 8, -8, 4, -4, 4, -4, 2, 6, -2, -6, 6, 2, -6, -2\}$$

Or $$\text{dir\_table\_x}[] = \{1, -1, 0, 0, 1, -1, 1, -1, 2, -2, 2, -2, 1, 1, -1, -1\}$$

dir_table_y[ ]={0, 0, 1, −1, 1, −1, −1, 1, 1, 1, −2, −1, 2, −2, 2, −2} in the case of four directions (numDir=4)

$$\text{dir\_table\_x}[\ ] = \{1, -1, 0, 0\}$$

$$\text{dir\_table\_y}[\ ] = \{0, 0, 1, -1\}$$

Note that the size of the direction table and the order of elements in the direction table may be other than those described above.

Multiple Distance Tables

In addition, the number of distance tables is not limited to one, and multiple distance tables may be provided. For example, the MMVD prediction unit 30376 uses DistanceTable[ ] indicated by distance_list_idx decoded or derived from the coded data to derive the length of the difference vector DistFromBaseMV. With reference to these, the MMVD prediction unit 30376 may derive DistFromBaseMV from a first distance table DistanceTable1[ ] and a second distance table DistanceTable2[ ] as follows.

$$DistanceTable1\ [\ ] = \{1, 2, 3, 5\}$$

$$DistanceTable2\ [\ ] = \{4, 8, 16, 32\}$$

$$DistanceTable = DistanceTable1\ (\text{distance\_list\_idx} == 0)$$

$$DistanceTable = DistanceTable2\ (\text{distance\_list\_idx} == 1)$$

$$DistFromBaseMW = DistanceTable[\text{mmvd\_distance\_idx}]$$

Further, the MMVD prediction unit 30376 may use a two-dimensional table DistanceTable2d to switch between two distance tables.

$$DistanceTable2d\ [\ ] = \{\{1, 2, 3, 5\}, \{4, 8, 16, 32\}\}$$

$$DistFromBaseMW = DistanceTable2d[\text{distance\_list\_idx}][\text{mmvd\_distance\_idx}]$$

Derivation of Difference Vector

The MMVD prediction unit 30376 derives the difference vector refineMvLX from the base motion vector and the magnitude DistFromBaseMV of the difference vector. In a case that the merge candidate N related to the central vector is uni-prediction from an L0 reference picture (predFlagL0N=1, predFlagL1N=0), the MMVD prediction unit 30376 derives the difference vector of L0 refineMvL0 from the base motion vector and the magnitude DistFromBaseMV of the difference vector.

$$refineMvL0[0] = (DistFromBaseMV << shiftMMVD) * mvdUnit[0]$$

$$refineMvL0[1] = (DistFromBaseMV << shiftMMVD) * mvdUnit[1]$$

$$refineMvL0[0] = 0$$

$$refineMvL1[1] = 0$$

Here, shiftMMVD is a value adjusting the magnitude of the difference vector such that the magnitude is suitable for the precision MVPREC of the motion vector in the motion compensation unit 3091 (interpolation unit). For example, for MVPREC of 16, or a motion vector precision of 1/16 pixels, and four directions, or mvdUnit[0] and mvdUnit[1] being 0 or 1, the use of 2 is appropriate. Additionally, the shift direction of shiftMMVD is not limited to the left shift. For mvdUnit[0] and mvdUnit[1] being a value other than 0 or 1 (for example, 8), for example, in a case of 6, 8, 12, or 16 directions, or the like, the MMVD prediction unit 30376 may perform a right shift and normalization. For example, the MMVD prediction unit 30376 may perform multiplication of the base motion vector (mvdUnit[0], mvdUnit[1]) as follows, followed by a right shift.

$$refineMvL0[0] = (DistFromBaseMV * mvdUnit[0]) \gg shiftMMVD$$

$$refineMvL0[1] = (DistFromBaseMV * mvdUnit[1]) \gg shiftMMVD$$

Furthermore, the MMVD prediction unit 30376 may separately calculate the magnitude and the code of the motion vector. This similarly applies to the other derivation methods for the difference vector.

$$refineMvL0[0] = ((DistFromBaseMV * \text{abs}(mvdUnit[0])) \gg shiftMMVD) * \text{sign}(mvdUnit[0])$$

$$refineMvL0[1] = ((DistFromBaseMV * \text{abs}(mvdUnit[1])) \gg shiftMMVD) * \text{sign}(mvdUnit[1])$$

Otherwise, in a case that the merge candidate N related to the central vector is uni-prediction from the L1 reference picture (predFlagL0N=0, predFlagL1N=1), the MMVD prediction unit 30376 derives an L1 difference vector refineMvL1 from the base motion vector and the magnitude DistFromBaseMV of the difference vector.

$$refineMvL0[0] = 0$$

$$refineMvL0[1] = 0$$

$$refineMvL1[0] = (DistFromBaseMV \ll shiftMMVD) * mvdUnit[0])$$

$$refineMvL1[1] = (DistFromBaseMV \ll shiftMMVD) * mvdUnit[1]) \text{ or}$$

$$refineMvL1[0] = (DistFromBaseMV * mvdUnit[0]) \gg shiftMMVD$$

$$refineMvL1[1] = (DistFromBaseMV * mvdUnit[1]) \gg shiftMMVD$$

Otherwise, in a case that the merge candidate N related to the central vector is bi-prediction (predFlagL0N=1, predFlagL1N=1), the MMVD prediction unit 30376 derives a first difference vector firstMv from the base motion vector and the magnitude DistFromBaseMV of the difference vector.

$$firstMv[0] = (DistFromBaseMV \ll shiftMMVD) * mvdUnit[0])$$

$$firstMv[1] = (DistFromBaseMV \ll shiftMMVD) * mvdUnit[1]) \text{ or}$$

$$firstMv = (DistFromBaseMV * mvdUnit[0] \gg shiftMMVD$$

$$firstMv = (DistFromBaseMV * mvdUnit[1] \gg shiftMMVD$$

Here, firstMv corresponds to the reference picture and the difference vector with a larger POC distance (POC difference) between the target picture and the reference picture. In other words, assuming that, of the reference pictures in the reference picture list L0 and the reference picture list L1, a reference picture with a larger POC distance (POC difference) between the target picture and the reference picture is the reference picture of the reference picture list LX. firstMv is a difference vector between a reference block of the reference picture of the list LX having a larger POC distance (POC difference) and a target block on the target picture.

Subsequently, the MMVD prediction unit 30376 may scale firstMv to derive a second motion vector secondMv of the other reference picture (reference list LY (Y=1−X)). secondMv is a difference vector with respect to a reference picture of the list LY having a small POC distance.

For example, in a case that a distance between a target picture currPic and the L0 picture RefPicList0[refIdxLN0] is equal to or larger than a distance between the target picture and the L1 picture RefPicList1[refIdxLN1], firstMv corresponds to the L0 difference vector refineMvL0. Furthermore, the MMVD prediction unit 30376 may scale firstMv to derive the L1 difference vector refineMvL1.

$$refineMvL0[0] = firstMv[0]$$

$$refineMvL0[1] = firstMv[1]$$

$$refineMvL1[0] = \text{Clip3}(-32768, 32767, \text{Sign}(distScaleFactor * firstMV[0]) * ((\text{Abs}(disScaleFactor * refineMvL0[0]) + 127) \gg 8))$$

-continued $$refineMvL1[1] = \text{Clip3}(-32768, 32767, \text{Sign}(distScaleFactor * firstMV[1]) * ((\text{Abs}(disScaleFactor * refineMvL0[1]) + 127) \gg 8))$$

Here, the MMVD prediction unit 30376 derives a scaling value distScaleFactor from a POC difference between currPic and the L0 reference picture and a POC difference between currPic and the L1 reference picture as follows.

$$distScaleFactor = \text{Clip3}(-4096, 4095, (tb * tx + 32) \gg 6)(\text{Equation scale} - 1)$$

$$tx = (16384 + (\text{Abs}(td) \gg 1))/td$$

$$td = \text{Clip3}(-128, 127, DiffPicOrderCnt(currPic, RefPicList0[refIdxLN0]))$$

$$tb = Clip3(-128, 127, DiffPicOrderCnt(currPic, RefPicList1[refIdxLN1]))$$

DiffPicOrderCnt (currPic, RefPicList0[refIdxLN0] is a POC difference between currPic and the L0 reference picture, and DiffPicOrderCnt(currPic, RefPicList1[refIdxLN1]) is a POC difference between currPic and the L1 reference picture.

Otherwise, in a case that the distance between the target picture currPic and the L0 picture RefPicList0[refIdxLN0] is smaller than the distance between the target picture and the L1 picture RefPicList1[refIdxLN1], the first vector firstMv corresponds to the L1 difference vector refineMvL1. In this case, the MMVD prediction unit 30376 may scale the first vector firstMv to derive the L0 difference vector refineMvL0.

$$refineMvL0[0] = \text{Clip3}(-32768, 32767, \text{Sign}(distScaleFactor * firstMV[0]) * ((\text{Abs}(disScaleFactor * firstMv[0]) + 127) \gg 8))$$

$$refineMvL0[1] = \text{Clip3}(-32768, 32767, \text{Sign}(distScaleFactor * firstMV[1]) * ((\text{Abs}(disScaleFactor * firstMv[1]) + 127) \gg 8))$$

$$refineMvL1[0] = firstMv[0]$$

$$refineMvL1[1] = firstMv[1]$$

distScaleFactor is derived from (Equation scale-1) described above, and is calculated by using td and tb.

$$td = \text{Clip3}(-128, 127, DiffPicOrderCnt(currPic, RefPicList1[refIdxLN1]))$$

$$tb = Clip3(-128, 127, DiffPicOrderCnt(currPic, RefPicList0[refIdxLN0]))$$

Note that the branch between "a case of being equal to or larger than a distance" and "otherwise, a case of being less than the distance" may be a branch between "a case of being larger than a distance" and "otherwise, a case of being equal to or less than the distance".

Note that in a case that the distance between the target picture currPic and the L0 picture RefPicList0[refIdxLN0] is equal to the distance between the target picture and the L1 picture RefPicList1[refIdxLN1], the MMVD prediction unit 30376 may set refineMvLX[ ] in accordance with the following processing (Processing A or Processing B) without scaling firstMv[ ].

Processing A:

$$refineMvL0[0] = firstMv[0]$$

$$refineMvL0[1] = firstMv[1]$$

$$refineMvL1[0] = firstMv[0]$$

$$refineMvL1[1] = firstMv[1]$$

Processing B:

$$refineMvL0[0] = firstMv[0]$$

$$refineMvL0[1] = firstMv[1]$$

$$refineMvL1[0] = firstMv[0]$$

$$refineMvL1[1] = firstMv[1]$$

More specifically, the MMVD prediction unit 30376 derives refineMvLX[ ] in accordance with Processing A in a case that the L0 reference picture, the target picture currPic, and the L1 target picture are arranged in time order, and otherwise, derives refineMvLX[ ] in accordance with Processing B.

Note that the case of the arrangement in time order is a case of satisfying (POC_L0−POC_curr)*(POC_L1−POC_curr)<0, that is, a case of the following expression.

$$DiffPicOrderCnt(RefPicList0[refIdxLN0], currPic) * DiffPicOrderCnt(currPic, RefPicList1[refIdxLN1]) > 0$$

Here, POC_L0, POC_L1, and POC_curr respectively indicate the Picture Order Counts (POCs) of the L0 reference picture, the L1 reference picture, and the target picture.

The inverse case (a reverse time order) is a case of satisfying (POC_L0−POC_curr)*(POC_L1−POC_curr)>0, that is, the following expression.

$$DiffPicOrderCnt(RefPicList0[refIdxLN0], currPic) * DiffPicOrderCnt(currPic, RefPicList1[refIdxLn1]) < 0$$

Note that, even in a case that the POC distances are different, the MMVD prediction unit 30376 may scale, after deriving refineMvLX[ ] in accordance with Processing A or Processing B, refineMvLX[ ] according to the POC distance between the reference picture and the target picture to derive the final refineMvLX[ ].

Addition of Central Vector and Difference Vector

Finally, the MMVD prediction unit 30376 derives a motion vector of an MMVD merge candidate from the difference vector refineMv[ ] and the central vector mvLXN[ ] (mvpLX[ ]) as follows.

$$mvL0[0] = mvL0N[0] + refineMvL0[0]$$

$$mvL0[1] = mvL0N[1] + refineMvL0[1]$$

-continued $$mvL1[0] = mvL1N[0] + refineMvL1[0]$$

$$mvL1[1] = mvL1N[1] + refineMvL1[1]$$

Note that mvLX[ ] described above is denoted as tempMvLX[ ] in a case of deriving mvLX[ ] as a temporary motion vector.

Conclusion

Thus, even in a case that the central vector is obtained by bi-prediction, the MMVD prediction unit 30376 signals only information (mmvd_direction_idx, mmvd_distance_idx) regarding one of the motion vectors. Then, two motion vectors are derived from the information. The MMVD prediction unit 30376 performs scaling of the motion vector as necessary from the difference in POC between each of the two reference pictures and the target picture. A difference vector between a reference block of the reference picture having the larger POC distance (POC difference) and the target block on the target picture is the first difference vector (firstMv).

$$firstMv[0] = (DistFromBaseMV \ll shiftMMVD) * mvdUnit[0]$$

$$firstMv[0] = (DistFromBaseMV \ll shiftMMVD) * mvdUnit[1]$$

The MMVD prediction unit 30376 derives the motion vector mvdLY (secondMv) of the reference picture with the smaller POC distance, LY(Y=1−X), by scaling based on a POC distance ratio (POCS/POCL) between the pictures.

$$secondMv[0] = (DistFromBaseMV \ll shiftMMVD) * mvdUnit[0] * POCS/POCL$$

$$secondMv[1] = (DistFromBaseMV \ll shiftMMVD) * mvdUnit[1] * POCS/POCL$$

Note that the reference picture with the smaller POC distance corresponds to the reference picture with the smaller POC distance (POC difference) between the target picture and the reference picture. Here, POCS is a difference value of the POC difference between the reference picture closer to the target picture and the target picture, and POCL is a difference value of the POC difference between the reference picture farther from the target picture and the target picture.

As described above, the MMVD prediction unit 30376 derives mvpLX[ ](mvLXN[ ]) and refineMvLX[ ], which are used to derive the motion vector mvLX[ ] of the target block.

$$mvLX[0] = mvpLX[0] + refineMvLX[0]$$

$$mvLX[1] = mvpLX[1] + refineMvLX[1]$$

Rounding of Motion Vector to Nearest Integer

The MMVD prediction unit 30376 may correct the motion vector mvLX of the target block to indicate an integer pixel position in a case that the magnitude DistFromBaseMV of the difference vector to be added to the central vector is larger than a prescribed threshold. For example, the MMVD prediction unit 30376 may perform conversion (rounding-off) to the nearest integer in a case that DistFromBaseMV is larger than or equal to a prescribed threshold of 16.

Further, the MMVD prediction unit 30376 may perform round-off to the nearest integer in a case that distance_list_idx indicates a specific distance table (for example, DistanceTable2) and that mmvd_distance_idx is within a specific range (for example, mmvd_distance_idx is 2 or 3). distance_list_idx is an index for selecting a distance table, and mmvd_distance_idx is an index for selecting an element of the distance table (selecting a coefficient of the distance). For example, the MMVD prediction unit 30376 may modify mvLX in accordance with the following equation in a case that distance_list_idx==1 and mmvd_distance_idx>=2.

$$mvLX[0] = (mvLX[0]/MVPREC) * MVPREC$$

$$mvLX[1] = (mvLX[1]/MVPREC) * MVPREC$$

Also, the MMVD prediction unit 30376 may derive mvLX by using a shift.

$$mvLX[0] = (mvLX[0] \gg MVBIT) \ll MVBIT$$

$$mvLX[1] = (mvLX[1] \gg MVBIT) \ll MVBIT$$

Here, MVBIT=log 2(MVPREC). For example, 4. Additionally, with positive and negative taken into consideration, the following derivation may be performed.

$$mvLX[0] = mvLX[0] >= 0 ?\ (mvLX[0] \gg MVBIT) \ll MVBIT :\ -((-mvLX[0] \gg MVBIT) \ll MVBIT)$$

$$mvLX[1] = mvLX[1] >= 0 ?\ (mvLX[1] \gg MVBIT) \ll MVBIT :\ -((-mvLX[1] \gg MVBIT) \ll MVBIT)$$

By rounding the motion vector to the nearest integer in this way, the amount of computation for generation of a prediction image can be reduced.

Syntax

FIG. 9 is a syntax example of merge_data( ) signaled in a case that merge prediction is ON (general_merge_flag==1) for the target block. general_merge_flag is a flag indicating whether a prediction parameter of the target block is derived from the neighbouring block, which is signaled in a case that the target block is not in a skip mode. That is, general_merge_flag is a flag indicating whether a merge mode is used. In a case of the skip mode, the inter prediction parameter derivation unit 303 sets general_merge_flag=1. merge_data( ) is a syntax structure signaling a parameter of merge prediction.

merge_subblock_flag is a flag indicating whether a parameter of subblock-based inter prediction of the target block is derived from the neighbouring block. In a case that merge_subblock_flag is 1, it is indicated that the subblock-based inter prediction is used. In a case that merge_subblock_flag is 0, it is indicated that the subblock-based inter prediction is not used.

regular_merge_flag is a flag indicating whether a regular merge mode or a merge mode (MMVD) using a differential motion vector is used for the target block. In a case that regular_merge_flag is 1, it is indicated that the regular merge mode or MMVD is used. In a case that regular_merge_flag is 0, it is indicated that the regular merge mode and MMVD are not used.

mmvd_merge_flag is a flag indicating whether the MMVD is used for the target block. In a case that mmvd_merge_flag is 1, it is indicated that the MMVD is used for the target block. At this time, the parameter decoder 302 decodes mmvd_cand_flag, mmvd_distance_idx, and mmvd_direction_idx.

In a case that mmvd_merge_flag is 0, it is indicated that the regular merge mode is used for the target block. Furthermore, mmvd_cand_idx is derived from mmvd_distance_idx and mmvd_direction_idx. mmvd_cand_idx is an index indicating an MMVD candidate included in an MMVD candidate list. The MMVD candidate list is a list for storing MMVD candidates.

$$\text{mmvd\_cand\_idx} = \text{mmvd\_distance\_idx} * numDir + \text{mmvd\_direction\_idx}$$

Here, mmvd_distance_idx=0 . . . numDist−1, mmvd_direction_idx=0 . . . numDir−1. numDir represents the number of prescribed directions of the difference vector in the MMVD (for example, numDir=16 in a case of 16 directions). numDist represents the number of prescribed distances of the difference vector in the MMVD (for example, numDist=6 for six distances). mmvd_distance_idx and mmvd_direction_idx may be hereinafter abbreviated and denoted as dist and dir.

FIG. 10 illustrates another example of the syntax table of the MMVD prediction unit 30376. In a case that it is indicated that MMVD is used for the target block (mmvd_merge_flag==1), the parameter decoder 302 decodes mmvd_cand_flag and mmvd_cand_idx. mmvd_cand_idx may take a value of 0 to maxNumMmvdLUT−1 (for example, 11). FIG. 10 illustrates an example in which mmvd_cand_idx is signaled instead of being mmvd_distance_idx and mmvd_direction_idx of FIG. 9 signaled. The parameter decoder 302 may code and decode mmvd_cand_idx, by using Truncated Rice (TR) binary or Truncated Binary (TB) with cMax=11 and a Rice parameter of 1. cMax is an upper limit value of a possible value of the syntax element.

Another Configuration of MMVD Prediction Unit 30376

Figure 11:
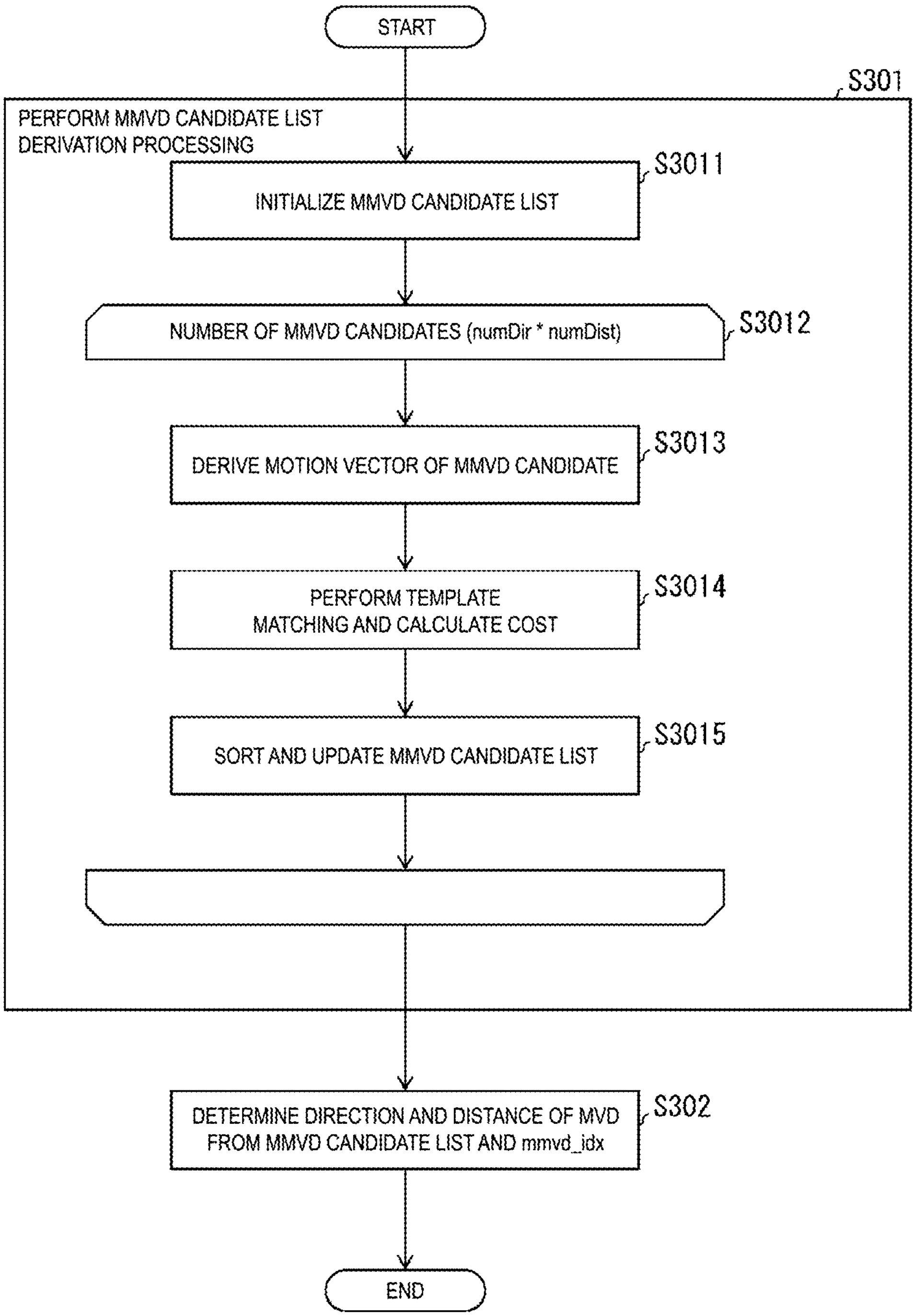
FIG. 11 is a flowchart illustrating a process flow of the other configuration of the MMVD prediction.

FIG. 11 is a flowchart illustrating processing for another configuration in the MMVD prediction unit.

Another configuration of the MMVD prediction unit 30376 will be described. In the present embodiment, in a case that MMVD prediction is used (in a case of mmvd_merge_flag being 1), the MMVD prediction unit 30376 derives an MMVD candidate list mmvdLUT (S301) and derives a difference vector (MVD) by using the index mmvd_cand_idx indicating an MMVD candidate (S302). The MMVD prediction unit 30376 uses mmvdLUT and mmvd_cand_idx to select the MMVD candidate and then to derive a motion vector of the target block. For example, the MMVD prediction unit 30376 may select the MMVD candidate according to mmvdLUT[mmvd_cand_idx].

The MMVD candidate may be motion vectors of L0 and L1 (MvL0[0], MvL0[1], MvL0[0], MvL0[1]). In this case, mmvdLUT is as follows.

$$mmvdLUT[][] = \{(MvL0[0], MvL0[1], MvL0[0], MvL0[1]), (MvL0[0], MvL0[1], MvL0[0], MvL0[1]), \ldots\}$$

The MMVD prediction unit 30376 selects an MMVD candidate and derives a motion vector by using mmvdLUT and mmvd_cand_idx (=tempIdx).

$$mvL0[0](=tempMvL0[0]) = mvL0[0] \text{ in } mmvdLUT[\text{mmvd\_cand\_idx}] \quad \text{(Equations MMVD-1)}$$
$$mvL0[1](=tempMvL0[1]) = mvL0[1] \text{ in } mmvdLUT[\text{mmvd\_cand\_idx}]$$
$$mvL1[0](=tempMvL1[0]) = mvL1[0] \text{ in } mmvdLUT[\text{mmvd\_cand\_idx}]$$
$$mvL1[1](=tempMvL1[1]) = mvL1[1] \text{ in } mmvdLUT[\text{mmvd\_cand\_idx}]$$

The above may be expressed as follows.

$$mvL0[0](=tempMvL0[0]) = mmvdLUT[\text{mmvd\_cand\_idx}][0]$$
$$mvL0[1](=tempMvL0[1]) = mmvdLUT[\text{mmvd\_cand\_idx}][1]$$
$$mvL1[0](=tempMvL1[0]) = mmvdLUT[\text{mmvd\_cand\_idx}][2]$$
$$mvL1[1](=tempMvL1[1]) = mmvdLUT[\text{mmvd\_cand\_idx}][3]$$

Alternatively, the MMVD candidate may be a difference vector (firstMv[0], firstMv[1]).

$$mmvdLUT[][] = \{(firstMv[0], fisetMv[1]), (fistMv[0], fisetMv[1]), (fist[0], fisetMv[1]), \ldots\}$$

The MMVD prediction unit 30376 selects an MMVD candidate by using mmvdLUT and mmvd_cand_idx (=tempIdx), derives firstMv, and derives a motion vector mvLX (=tempMvLX) from firstMv.

$$firstMV[0] = firstMV[0] \text{ in } mmvdLUT[\text{mmvd\_cand\_idx}]$$
$$firstMV[1] = firstMV[1] \text{ in } mmvdLUT[\text{mmvd\_cand\_idx}]$$

The above may be expressed as follows.

$$firstMv[0] = mmvdLUT[\text{mmvd\_cand\_idx}][0]$$
$$firstMv[1] = mmvdLUT[\text{mmvd\_cand\_idx}][1]$$

The method for deriving the motion vector tempMvLX from firstMv has already been described.

Further, the MMVD candidate may be a position of the difference vector (a direction and a distance from the central vector).

$$mmvdLUT[][] = \{(\text{mmvd\_direction\_idx}, \text{mmvd\_distance\_idx}), (\text{mmvd\_direction\_idx}, \text{mmvd\_distance\_idx}), (\text{mmvd\_direction\_idx}, \text{mmvd\_distance\_idx}), \ldots\}$$

The MMVD prediction unit 30376 may select an MMVD candidate (mmvd_direction_idx, mmvd_distance_idx) by using mmvdLUT and mmvd_cand_idx (tempIdx).

$$\text{mmvd\_direction\_idx} = \text{mmvd\_direction\_idx in } mmvdLUT[\text{mmvd\_cand\_idx}]$$

$$\text{mmvd\_distance\_idx} = \text{mmvd\_distance\_idx in } mmvdLUT[\text{mmvd\_cand\_idx}]$$

The above may be expressed as follows.

$$\text{mmvd\_direction\_idx} = mmvdLUT[\text{mmcd\_cand\_idx}][0]$$

$$\text{mmvd\_distance\_idx} = mmvdLUT[\text{mmvd\_cand\_idx}][1]$$

$$\text{mmvd\_cand\_idx} = \text{mmvd\_distance\_idx} * numDir + \text{mmvd\_direction\_idx}$$

The motion vector mvLX (=tempMvLX) may be derived from mmvd_cand_idx by (Equations MMVD-1).

Also, the MMVD candidate may simply be an MMVD candidate number.

$$mmvdLUT[\ ][\ ] = \{0, 1, 2, 3, \ldots\}$$

In this case, the derivation of the motion vector from the optimal number mmvdLUT[mmvd_cand_idx] or mmvdLUT[tempIdx] may be performed by using firstMv[ ], which will be described below.

$$dist = tempIdx/numDir;$$

$$dir = tempIdx - dist * numDir;$$

$$firstMv[0] = (dist \ll shiftMMVD) * \text{dir\_table\_x}[dir]$$

$$firstMv[1] = (dist \ll shiftMMVD) * dir \text{ table } y[dir]$$

In the present embodiment, by using the mmvd candidate list arranged in ascending order of cost, a code amount of the information (mmvd_distance_idx, mmvd_direction_idx, or mmvd_cand_idx) necessary for deriving the difference vector is reduced, thereby exhibiting an effect of improving coding efficiency.

MMVD Candidate List Derivation Processing

The MMVD prediction unit 30376 derives a final MMVD candidate list mmvdLUT by calculating a cost tempCost (template matching cost) for each MMVD candidate and sorting the MMVD candidates in ascending order of cost. First, all elements of mmvdLUT may be derived in advance, and mmvdLUT1 may be derived by replacing candidates of mmvdLUT with each other by using the costs. In addition, the MMVD prediction unit 30376 may derive the MMVD candidate list mmvdLUT by adding, in ascending order of cost, the MMVD candidates to the MMVD candidate list mmvdLUT which is in an empty state as an initial state. In addition, in a case that the MMVD prediction unit 30376 adds the MMVD candidate to the list, and that the additional position exceeds the maximum candidate number maxNumMmvdLUT (for example, 12) of the list, the addition of the MMVD candidate may be skipped.

Here, details of the flowchart of FIG. 11 will be described.

First, the MMVD prediction unit 30376 initializes the MMVD candidate list mmvdLUT (S3011). Motion vectors of all candidates may be derived as elements of mmvdLUT. For example, derivation is performed for tempIdx=0 . . . numDir*numDist−1.

$$dist = tempIdx/numDir;$$

$$dir = tempIdx - dist * numDir;$$

By using the above equations, mmvdLUT having {dir, dist} as elements may be used. mmvdLUT having {firstMv[0], firstMv[1]} derived from {dir, dist} as elements may be used. Furthermore, a table having {mvLX[0], mvLX[1]} derived from firstMv as elements may be used.

Here, the MMVD prediction unit 30376 may obtain a direction (dir) and a distance (dist) from an integer (index) tempIdx indicating each element of mmvdMergeCand.

firstMv is derived by using dist and dir.

$$firstMv[0] = (dist \ll shiftMMVD) * \text{dir\_table\_x}[dir]$$

$$firstMv[1] = (dist \ll shiftMMVD) * \text{dir\_table\_y}[dir]$$

Then, refineMvL0 and refineMvL1 are derived from the firstMv, and tempMvLX[ ](X=0,1) is derived, by a method similar to that in Derivation of Difference Vector.

$$tempMvLX[0] = mvpLX[0] + refineMvLX[0]$$

$$tempMvLx[1] = mvpLX[1] + refineMvLX[1]$$

The derived tempMvLX is stored as the element mmvdLUT [tempIdx] of mmvdLUT.

Next, the MMVD prediction unit 30376 causes a loop to be performed as many times as the number of necessary candidates (for example, NumMmvdCand=numDir*numDist) and derives the costs tempCost of the MMVD candidates (S3012).

The MMVD prediction unit 30376 obtains a direction (dir) and a distance (dist) for each MMVD candidate (mmvdMergeCand). Then, the MMVD prediction unit 30376 obtains a motion vector tempMvLX of the MMVD candidate (S3013).

Next, the MMVD prediction unit 30376 performs template matching using tempMvLX and calculates the cost (S3014). Left and top pixels adjacent to the target block are set as a template (rec template) and pixels of a reference block (ref template) indicated by tempMvLx. The MMVD prediction unit 30376 may perform the template matching to derive the ref template (and the corresponding difference vector tempMvLx) that minimizes the difference (cost, tempCost) between the rec template and the ref template. Further, a Sum of Absolute Difference (SAD) or a Sum of Squared Distance (SSD) may be used as tempCost.

For example, the sum of a sum of absolute difference between a left adjacent to region of the reference block and a left adjacent region of the target block and a sum of absolute difference between an upper adjacent to region of the reference block refSamplesLX and an upper adjacent to region of the target block may be used as tempCost.

$$tempCost = \sum abs(refSamplesLX[xC + iL + tempMvLX[0]][yC + jL + tempMvLX[1]] - recSamples[xC + i][xC + j]) + \sum abs(refSamplesLX[xC + iT + tempMvLX[0]][yC + jT + tempMvLx[1]] - recSamples[xC + i][xC + jT])$$

Here, $X = 0$ or 1.

Here, refSamples is the reference picture, recSamples is the target picture, tempMvLX[2] is the motion vector of the MMVD candidate, xC and yC are top left coordinates of the target block, and nW and nH are a width and a height of the block. E is the sum related to iL=−1, jL=0 . . . nH−1, iT=0 . . . nW−1, and jT=−1.

It should be noted that the above processing may be performed after converting fractional precision to integer precision.

$$tempMvLx[0] = (abs(tempMvLX[0] \gg shiftMMVD) * sign(tempMvLX[0])$$

$$tempMV[1] = (abs(tempMV[1] \gg shiftMMVD) * sign(tempMvLX[1])$$

ShiftMMVD=4 is held in a case of a fractional precision of 1/16.

In order to derive firstMv with the integer precision, firstMv may be derived in advance as follows.

$$firstMv[0] = dist * \mathrm{dir\_table\_x}[dir]$$

$$firstMv[1] = dist * \mathrm{dir\_table\_y}[dir]$$

Then, the MMVD prediction unit 30376 updates the MMVD candidate list according to the cost obtained in S3014 (S3015). The MMVD prediction unit 30376 may sort the MMVD candidate list in ascending order of cost. Note that as described below, a position insertPos at which mmvdLUT is interpolated may be derived, and the table indicated equal to or below insertPos may be updated.

```
insertPos = 0
while (insertPos < maxNumMmvdLUT && tempCost <
candCostList[endIdx-1-insertPos]) {
insertPos++;
}
if (insertPos != 0)
{
for (i = 1; < insertPos; i++)
{
mmvdLUT[endIdx - i] = mmvdLUT[endIdx - 1 - i]
candCostList[endIdx - i] = candCostList[endIdx - 1 - i]
}
mmvdLUT[endIdx - insertPos] = tempIdx
candCostList[endIdx - insertPos] = tempCost
}
```

Here, while (x) {process} means a loop process that repeats the process while x is true. mmvdLUT is a list that stores tempIdx. endIdx is the last index of the group, for example, endIdx=(tempIdx/grpSize)*grpSize+grpSize. Here, grpSize is set to any one of 1, 2, 4, or 8. candCostList [idx] is a list of tempCost of the MMVD candidate indicated by idx.

The MMVD prediction unit 30376 performs the processing of S3013 to S3015 as many times as the number of MMVD candidates. By the above-described processing, the MMVD prediction unit 30376 derives the MMVD candidate list.

According to the present embodiment, the MMVD prediction unit 30376 performs the template matching for all MMVD candidates and performs cost calculation. For example, in a case that the MMVD has 16 directions and 6 distances, the template matching (cost derivation and sorting) is performed 96 times.

Another Example of MMVD Candidate List Derivation Processing

In the present embodiment, MMVD candidates for cost calculation are selected or not selected adaptively. This exhibits an effect of reducing the calculation amount without deteriorating coding efficiency.

Figure 12:
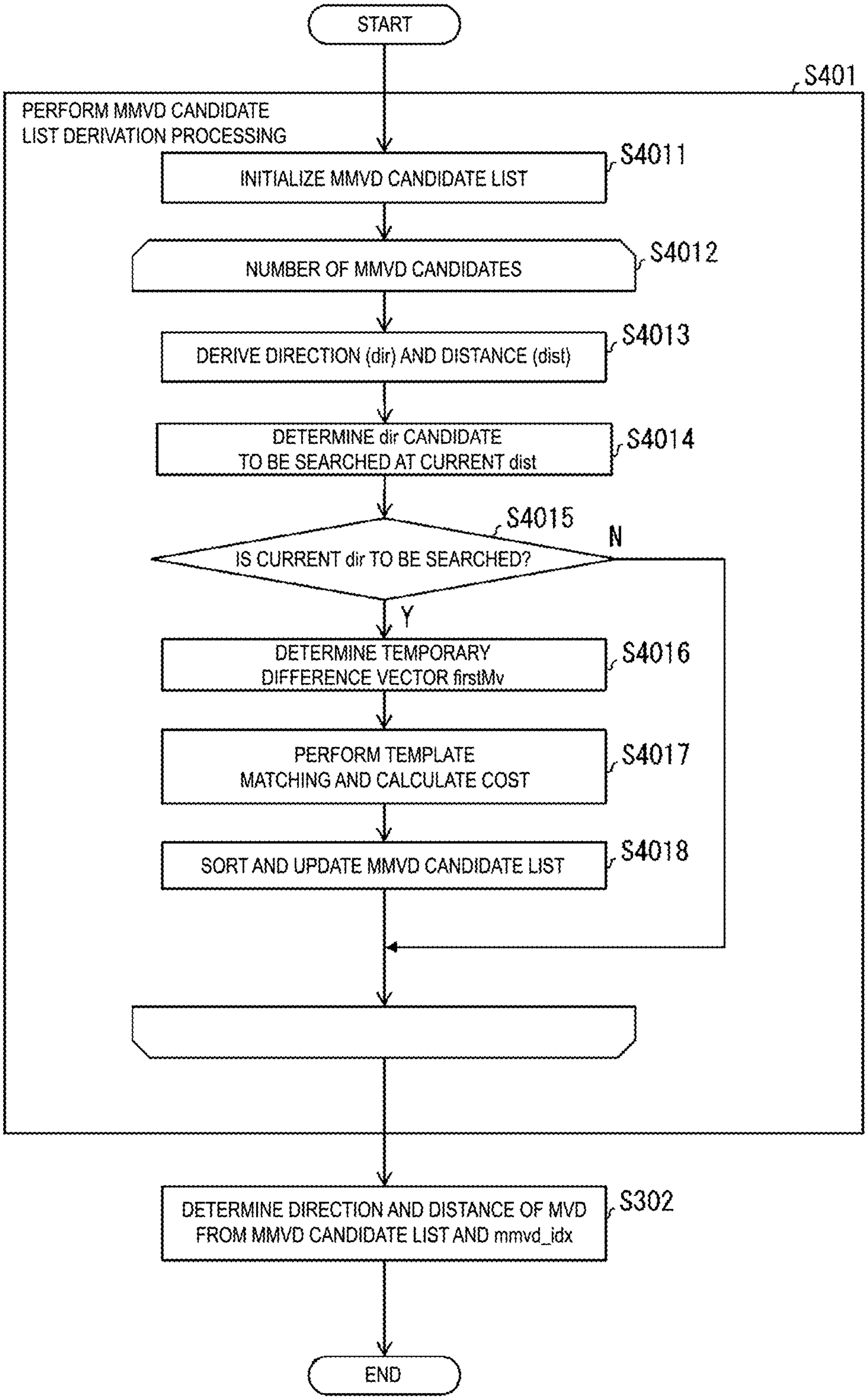
FIG. 12 is a flowchart illustrating a process flow in another configuration of MMVD candidate list derivation processing.

FIG. 12 is a flowchart illustrating a process flow of processing of determining a direction and a distance of a difference vector in the present embodiment. Note that processing (S302) in which the MMVD prediction unit 30376 selects an MMVD candidate by using mmvdLUT and mmvd_cand_idx is similar to that described with reference to FIG. 11.

First, the MMVD prediction unit 30376 initializes the MMVD candidate list (S4011). The MMVD candidate indicates the position of the difference vector (the direction and the distance from the central vector). The MMVD candidate list is a list for storing MMVD candidates. Next, the MMVD prediction unit 30376 causes the loop of the cost derivation processing to be performed as many times as the number of candidates (numDir*numDist) for the candidates that can be the difference vector (S4012).

The MMVD prediction unit 30376 derives a direction (dir) and a distance (dist) corresponding to each MMVD candidate (mmvdMergeCand) (S4013).

The MMVD prediction unit 30376 determines a search direction (dir) of mmvdMergeCand at the current distance (dist) (S4014). The MMVD prediction unit 30376 determines whether the direction is the derived search direction for each element of mmvdMergeCand (S4015), and derives the cost in a case that the direction is the derived search direction (Y in S4015). Hereinafter, searching for XX means deriving tempCost by using XX as a search candidate.

In a case that it is determined that the direction is not the derived search direction (N in S4015), the MMVD prediction unit 30376 does not derive the cost for mmvdMergeCand and proceeds to cost derivation for the next element of mmvdMergeCand.

In a case that the direction is the derived search direction (Y in S4015), the MMVD prediction unit 30376 obtains a current temporary difference vector (firstMv) from the direction and the distance of the search candidate (S4016).

Next, the MMVD prediction unit 30376 performs the template matching using tempMvLX derived in a manner similar to that in MMVD Candidate List Derivation Processing, and calculates a cost tempCost (S4017). Then, the MMVD prediction unit 30376 updates the MMVD candidate list in ascending order of cost according to the cost obtained in S4017 (S4018).

The MMVD prediction unit 30376 performs the processing of S4013 to S4018 as many times as the number of MMVD candidates. By the above-described processing, the MMVD prediction unit 30376 derives the MMVD candidate list.

Figure 13:
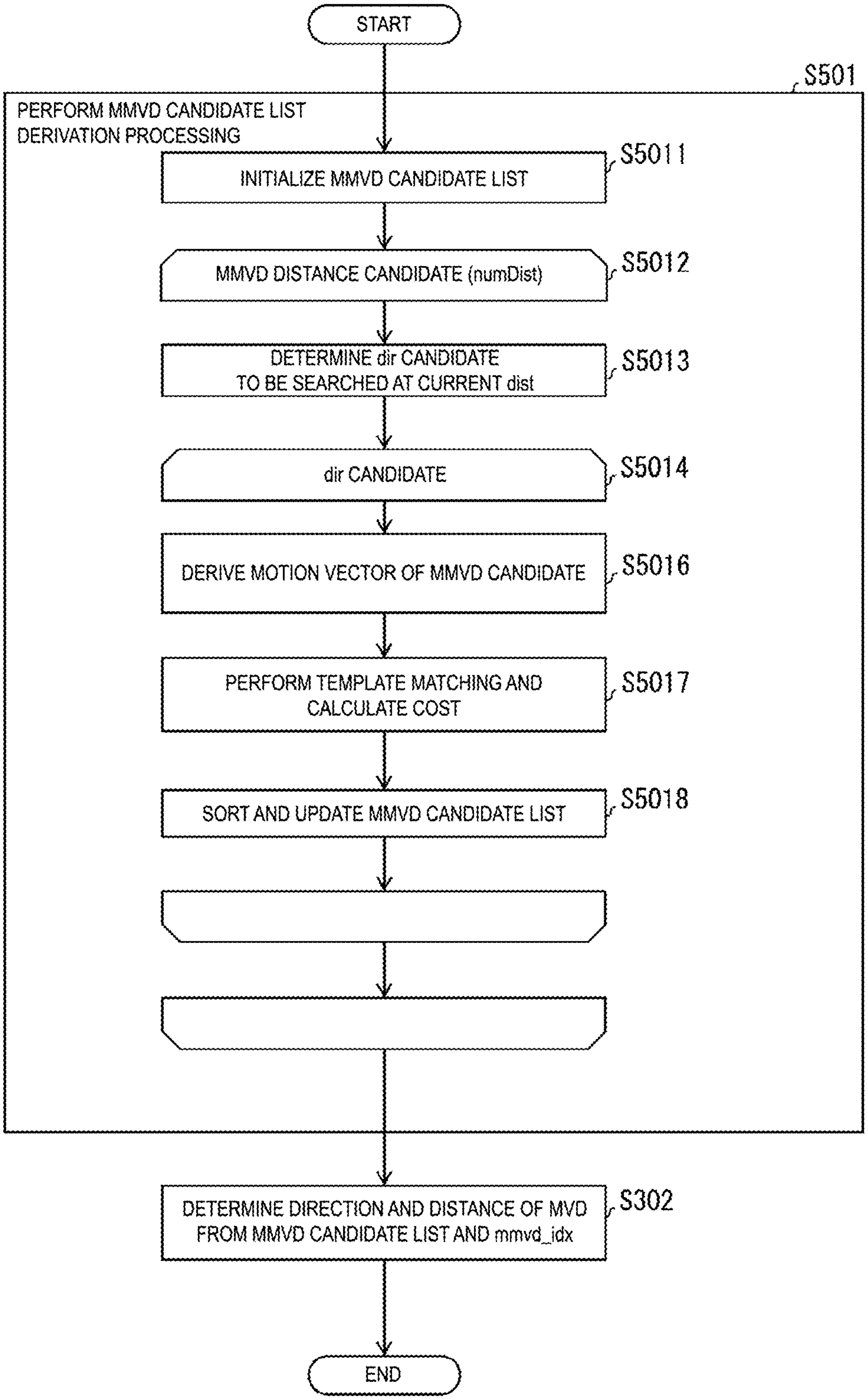
FIG. 13 is another flowchart illustrating a process flow in another configuration of the MMVD candidate list derivation processing.

Further, FIG. 13 is another flowchart illustrating a process flow of determining the direction and the distance of the difference vector in the present embodiment. Note that processing (S302) in which the MMVD prediction unit 30376 selects an MMVD candidate by using mmvdLUT and mmvd_cand_idx is similar to that illustrated in FIG. 11.

First, the MMVD prediction unit 30376 initializes the MMVD candidate list (S5011). Next, the MMVD prediction unit 30376 causes a loop to be performed as many times as the number of candidates (numDist) for the distance candidates that can be the difference vector (S5012). Here, the MMVD prediction unit 30376 determines the direction (dir) of the difference vector to be searched at the current distance (dist) (S5013). Details of the determination method will be described later. Next, the MMVD prediction unit 30376 causes a loop to be performed as many times as the number of candidates for the direction determined to be searched in S5013 (S5014).

The MMVD prediction unit 30376 derives the motion vector of the MMVD candidate from the direction and the distance of the difference vector (S5016). Next, the MMVD prediction unit 30376 performs the template matching using the motion vector of the MMVD candidate and calculates a cost (S5017). Then, the MMVD prediction unit 30376 updates the MMVD candidate list in ascending order of cost according to the cost obtained in S5017 (S4018).

The MMVD prediction unit 30376 performs the processing from S5016 to S5018 as many times as the number of direction candidates in the search for the MMVD candidates. In addition, the MMVD prediction unit 30376 performs the processing from S5013 to S5018 as many times as the number of distance candidates for the MMVD candidates. By the above-described processing, the MMVD prediction unit 30376 derives the MMVD candidate list.

Details of Determination Method of Search Direction

A determination method of the search direction according to the distance (dist) of mmvdMergeCand corresponding to the processing S4014 or S5013 will be described.

Determination Method of Search Direction 1

The MMVD prediction unit 30376 may determine the search direction based on the following. A case of numDir=16 (16 directions) will be described below.

1: In a case that the distance is 0 (dist==0), only directions included in a direction group DIR1 are searched.

2: In a case of the other distances (dist!=0), only directions included in a direction group DIR2 are searched.

Here, each of the direction groups DIR1 and DIR2 is a subset (part) of the directions of the MMVD candidate. DIR1 may include directions, the number of which is half of the number of all directions. For example, the direction dir may satisfy dir=0 . . . numDir/2−1. For example, DIR1 may include eight directions of horizontal directions, vertical directions, and diagonal 45-degree directions. Integers or labels representing directions are used as described below.

$$DIR1 = \{0, 1, 2, 3, 4, 5, 6, 7\}$$

DIR1={top, top right, right, bottom right, bottom, bottom left, left, top left}

The direction group DIR2 may include a total of three directions that includes a direction and directions adjacent to the direction, the direction giving the minimum cost among the template matching costs, corresponding to the number of searches, obtained at the immediately previous distance dist. Alternatively, the direction group DIR2 may include up to six directions that includes two directions and directions adjacent to each of the two directions, the two directions giving the smallest cost among the template matching costs, corresponding to the number of searches, obtained at the immediately previous distance dist. The directions included in the direction group DIR2 may be updated for each dist.

Figure 14:
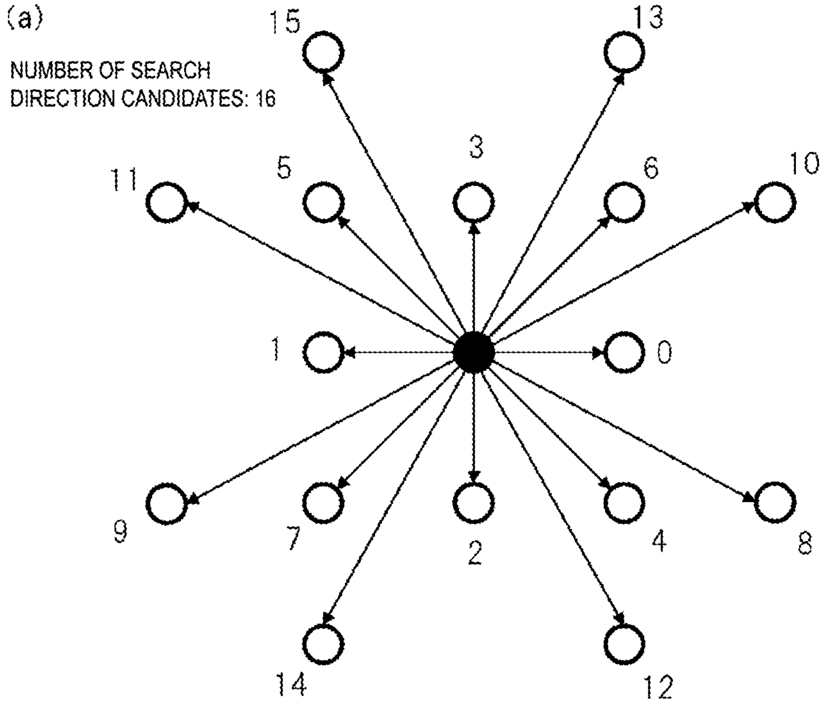
FIG. 14 is a diagram illustrating an example of candidates in 16 directions of MMVD candidates.
Figure 15:
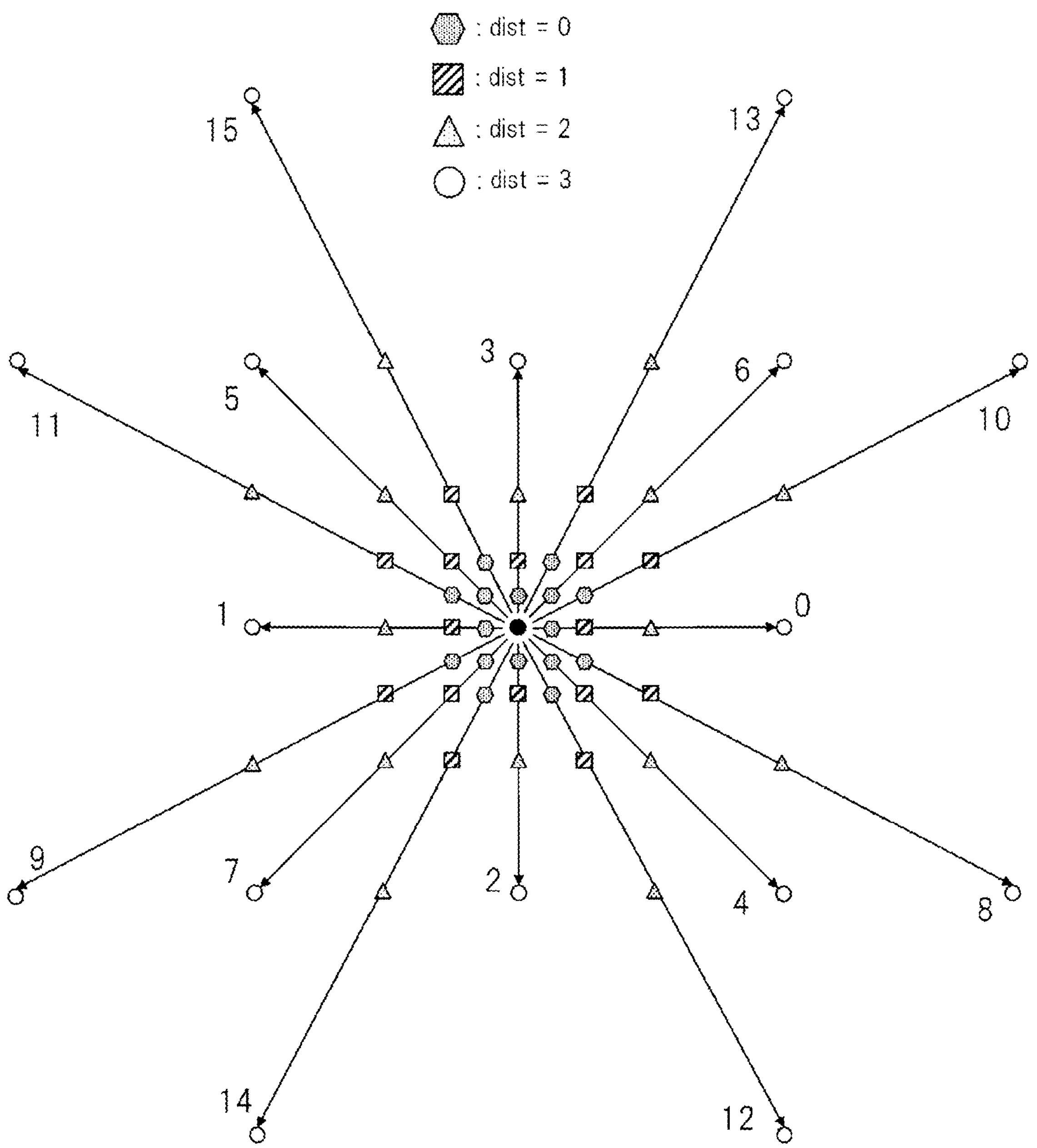
FIG. 15 is a diagram illustrating four distances of the candidates in the 16 directions of the MMVD candidates.

An example of limiting the search directions according to the distance illustrated in FIG. 12 and FIG. 13 will be described below with reference to FIG. 14 and FIG. 15. It is assumed that a total of 96 candidates of the difference vector exist in MMVD, and the candidates include 6 distances and 16 directions. Relationships between directions and indices are as illustrated in FIG. 14(*a*) and FIG. 14(*b*). FIG. 15 illustrates search candidates with distances dist up to 3. The behaviour of the MMVD prediction unit 30376 searching for the MMVD candidates will be described below. In the following example, the MMVD prediction unit 30376 searches for 23 (8+3*5) candidates.

Hereinafter, the operation of "adding the searched candidate to the MMVD candidate list and updating the MMVD candidate list in ascending order of cost" is referred to as "updating mmvdLUT for the searched candidate".

Step 1: Operation in a Case of Dist=0

By using the direction group DIR1={0, 1, 2, 3, 4, 5, 6, 7}, eight directions that includes horizontal directions, vertical directions, and diagonal 45-degree directions are searched. mmvdLUT is updated for the searched candidates. As a result of the search, in a case of dir=5, the cost is minimized.

Step 2: Operation in a Case of Dist=1

The three directions of dir=5 that gives the minimum cost in step 1 and dir=11 and 15 adjacent to dir=5 are selected and the direction group DIR2={5, 11, 15} for step 2 is derived. The three directions are searched by using DIR2={5, 11, 15}. mmvdLUT is updated for the searched candidates. As a result of the search, in a case of dir=5, the cost is minimized.

Step 3: Operation in a Case of Dist=2

DIR2={5, 11, 15} in step 3 is derived from the result of step 2. The three directions are searched by using DIR2={5, 11, 15}. mmvdLUT is updated for the searched candidates. As a result of the search, in a case of dir=15, the cost is minimized.

Step 4: Operation in a Case of Dist=3

DIR2={3, 5, 15} in step 4 is derived from the result of step 3. Searching is performed in three directions by using DIR2={3, 5, 15}. mmvdLUT is updated for the searched candidates. As a result of the search, in a case of dir=3, the cost is minimized.

Step 5: Operation in a Case of Dist=4

DIR2={3, 13, 15} in step 5 is derived from the result of step 4. Searching is performed in three directions by using DIR2={3, 13, 15}. mmvdLUT is updated for the searched candidates. As a result of the search, in a case of dir=3, the cost is minimized.

Step 6: Operation in a Case of Dist=5

DIR2={3, 13, 15} in step 6 is derived from the result of step 5. Searching is performed in three directions by using DIR2={3, 13, 15}. mmvdLUT is updated for the searched candidates.

From the above steps, the MMVD prediction unit 30376 derives the MMVD candidate list.

An example case in which the direction group DIR2 includes search candidates from a total of six directions including two directions that give the smallest cost and directions adjacent to each of the two directions will be described below.

Step 1: Operation in a Case of Dist=0

By using the direction group DIR1={0, 1, 2, 3, 4, 5, 6, 7}, eight directions that includes horizontal directions, vertical directions, and diagonal 45-degree directions are searched. mmvdLUT is updated for the searched candidates. As a result of the search, in a case of dir=5, the cost is minimized, and in a case of dir=0, the cost is the second minimum.

Step 2: Operation in a Case of Dist=1

Based on the result of step 1, six directions are searched by using the direction group DIR2={5, 11, 15, 0, 8, 10}. mmvdLUT is updated for the searched candidates. As a result of the search, in a case of dir=10, the cost is minimized, and in a case of dir=11, the cost is the second minimum.

Step 3: Operation in a Case of Dist=2

Based on the result of step 2, searching is performed in six directions by using the direction group DIR2={0, 6, 10, 1, 5, 11}. mmvdLUT is updated for the searched candidates. As a result of the search, in a case of dir=10, the cost is minimized, and in a case of dir=0, the cost is the second minimum.

Step 4: Operation in a Case of Dist=3

Based on the result of step 3, searching is performed in four directions by using the direction group DIR2={0, 6, 8, 10}. In a case that the directions giving low costs are adjacent to each other, there may be a case where six directions as in the present example do not necessarily exist. mmvdLUT is updated for the searched candidates. Although the subsequent processing is omitted, the MMVD prediction unit 30376 performs processing in a similar manner up to step 6.

From the above steps, the MMVD prediction unit 30376 derives the MMVD candidate list.

In the present embodiment, mmvdMergeCand for which cost calculation is to be performed is selected or not selected for each of distances in a search of the MMVD candidates. In particular, the search is characterized in that only the subset (DIR1) of the first direction is searched at a prescribed distance, and only the subset (DIR2) of the second direction is searched at a distance other than the prescribed distance. The search is characterized in that directions included in the subset (DTR2) of the second direction are searched for each distance candidate, and directions included in the subset (DIR2) of the second direction are updated for each distance candidate.

This exhibits an effect of reducing the calculation amount without deteriorating coding efficiency.

Determination Method of Search Direction 2

The MMVD prediction unit 30376 has multiple distance sets. At this time, the MMVD prediction unit 30376 may determine search directions based on the following.

1: In a case of a distance included in a distance set DIST1, only directions included in the direction group DIR1 are searched.

2: In a case of a distance included in the other distance sets, only directions included in the direction group DIR2 are searched.

Here, the direction group DIR1 may be as described in Determination Method of Search Direction 1.

The direction group DIR2 may include a total of three directions that includes a direction and directions adjacent to the direction, the direction giving the minimum cost among the template matching costs, corresponding to the number of searches, obtained in the immediately previous distance set. Alternatively, the direction group DIR2 may include up to four directions that includes two directions and directions adjacent to the two directions with the smallest cost, the two directions giving the smallest cost among the template matching costs, corresponding to the number of searches, obtained at the immediately previous distance. Alternatively, the direction group DIR2 may include up to six directions that includes two directions and directions adjacent to each of the two directions with the smallest cost, the two directions giving the smallest cost among the template matching costs, corresponding to the number of searches, obtained at the immediately previous distance.

The number of directions included in the direction group DIR2 may be updated for each distance set. In addition, a method for selecting directions included in the direction group DIR2 may be different for each distance set. For example, the number of directions to be searched in a distance set DIST2 may be six, and the number of directions to be searched in a distance set DIST3 may be four or three.

The distance set DIST1 may include only dist=0. In this case, the distance set DIST2 may include dist=1, 2, and the distance set DIST3 of dist=3, 4, . . . may be included.

Alternatively, the distance set DIST1 may include dist=0, 1. In this case, the distance set DIST2 may include dist=2, 3, and the distance set DIST3 of dist=4, 5, . . . may be included.

The behaviour of the MMVD prediction unit 30376 searching for the MMVD candidates will be described below.

Step 1: Operation in a Case of the Distance Set DIST1={0}

By using the direction group DIR1={0, 1, 2, 3, 4, 5, 6, 7}, eight directions that includes horizontal directions, vertical directions, and diagonal 45-degree directions are searched. mmvdLUT is updated for the searched candidates. As a result of the search, in a case of dir=5, the cost is minimized.

Step 2: Operation in a Case of the Distance Set DIST2={1, 2}

Based on the result of step 1, the direction group DIR2={5, 11, 15} is used to search for three directions including dir=5 that gives the minimum cost and dir=11, 15 adjacent to dir=5. mmvdLUT is updated for the searched candidates. As a result of the search, in a case of dir=5, the cost is minimized.

Step 3: Operation in a Case of the Distance Set DIST3={3, 4, 5}

Based on the result of step 2, searching is performed in three directions by using the direction group DIR2={5, 11, 15}. mmvdLUT is updated for the searched candidates.

From the above steps, the MMVD prediction unit 30376 derives the MMVD candidate list.

In addition, an example in which a method for selecting directions included in the direction group DIR2 differs for each distance set will be described. The following is an example in which the number of directions to be searched in the distance set DIST2 is six and the number of directions to be searched in the distance set DIST3 is three.

Step 1: Operation in a Case of the Distance Set DIST1={0}

By using the direction group DIR1={0, 1, 2, 3, 4, 5, 6, 7}, eight directions that includes horizontal directions, vertical directions, and diagonal 45-degree directions are searched. mmvdLUT is updated for the searched candidates. As a result of the search, in a case of dir=5, the cost is minimized, and in a case of dir=0, the cost is the second minimum.

Step 2: Operation in a Case of the Distance Set DIST2={1, 2}

Based on the result of step 1, six directions are searched by using the direction group DIR2={5, 11, 15, 0, 8, 10}. mmvdLUT is updated for the searched candidates. As a result of the search, in a case of dir=10, the cost is minimized.

Step 3: Operation in a Case of the Distance Set DIST3={3, 4, 5}

Based on the result of step 2, three directions are searched by using the direction group DIR2={0, 6, 10}. mmvdLUT is updated for the searched candidates.

From the above steps, the MMVD prediction unit 30376 derives the MMVD candidate list.

In the present embodiment, mmvdMergeCand for which cost calculation is performed in the MMVD candidate search is selected or not selected for each distance. In particular, what is characterized is that only the subset (DIR1) of the first direction is searched at a distance included in a prescribed distance set, and only the subset (DIR2) of the second direction is searched at a distance included in a distance set other than the prescribed distance set. Additionally, what is characterized is that directions included in the subset (DTR2) of the second direction are searched for a distance set including multiple distance candidates, and directions included in the subset (DIR2) of the second direction are updated for each distance set including multiple distance candidates. Further, the search is characterized by the number of directions included in the subset of the second direction (DIR2) being different depending on the distance set.

Additionally, although a case of 16 directions has been described above, in a case of 8 directions (numDir=8), dir=0 . . . numDir−1, and DIR1=0 . . . numDir/2−1 may be set and the search directions may be determined according to the distance. Further, in a case of four directions (numDir=4), dir=0 . . . numDir−1 and DIR1=0 . . . numDir/2−1 may be set, and the search directions may be determined according to the distance.

This exhibits an effect of reducing the calculation amount without deteriorating coding efficiency. In addition, selecting the search directions for each of multiple distances reduces dependency and parallel performance can be improved, thus exhibiting an effect in that calculation can be efficiently performed.

Early Termination of Search

The MMVD prediction unit 30376 calculates a template matching cost for each MMVD candidate mmvdMergeCand. At this time, in a case that the cost satisfies the following conditions, the MMVD prediction unit 30376 may terminate the search.

Early Termination Conditions for Search 1

The cost is less than a prescribed threshold TH1. Here, TH1 may be set as follows by using a target block width "width" and a target block height "height".

$$TH1 = C * \text{width} * \text{height}$$

C is a constant (for example, 5). That is, in a case that the cost per pixel reaches a cost less than C, the MMVD prediction unit 30376 terminates the search.

Early Termination Conditions for Search 2

The cost is larger than a prescribed constant TH2 times the minimum cost. Here, TH2 is 1.05 or 1.1, for example. That is, in a case that sufficient cost reduction cannot be achieved for a candidate having a large distance, the MMVD prediction unit 30376 does not search for a candidate having a larger distance.

The early termination of the search exhibits an effect of reducing the calculation amount without deteriorating coding efficiency.

Inter Prediction Image Generation Unit 309

In a case that predMode indicates the inter prediction, the inter prediction image generation unit 309 generates a prediction image of a block or a subblock through the inter prediction by using the inter prediction parameters input from the inter prediction parameter derivation unit 303 and the reference picture.

Figure 4:
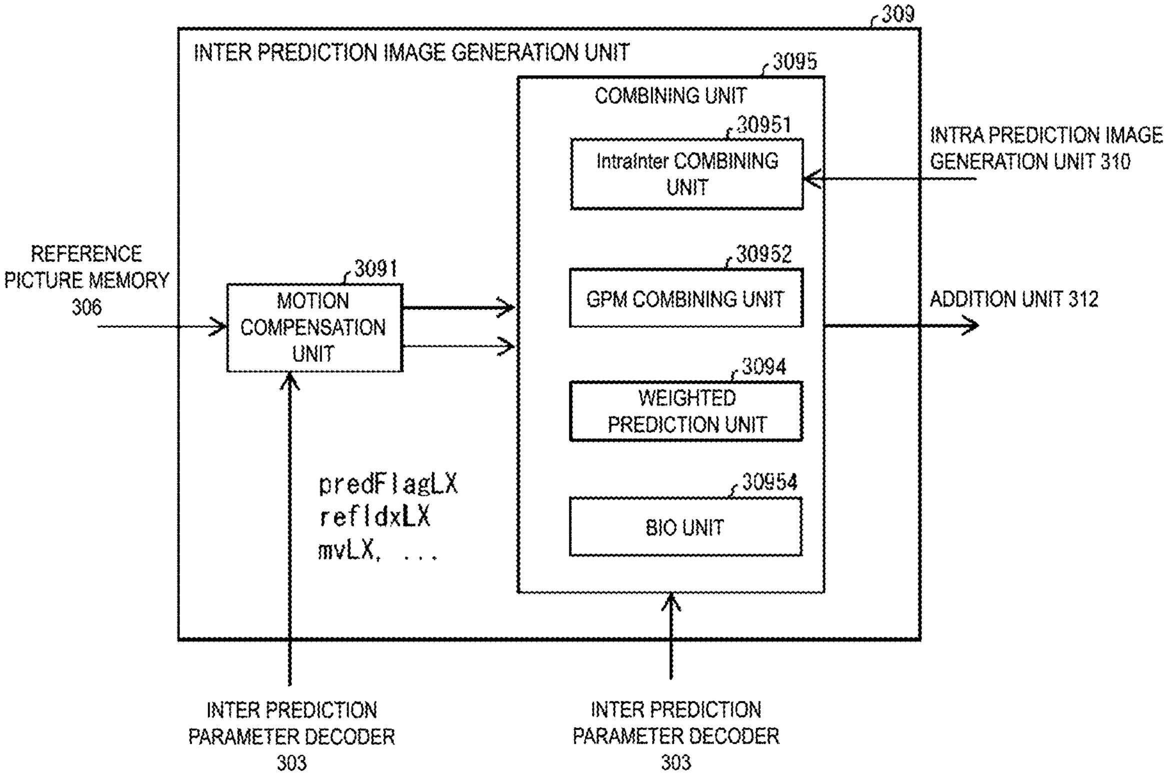
FIG. 4 is a schematic diagram illustrating a configuration of an inter prediction image generation unit.

FIG. 4 is a schematic diagram illustrating a configuration of the inter prediction image generation unit 309 included in the prediction image generation unit 308 according to the present embodiment. The inter prediction image generation unit 309 includes a motion compensation unit (prediction image generation apparatus) 3091 and a combining unit 3095. The combining unit 3095 includes an IntraInter combining unit 30951, a GPM combining unit 30952, a BIO unit 30954, and a weighted prediction unit 3094.

Motion Compensation

The motion compensation unit 3091 (interpolation image generation unit 3091) generates an interpolation image (motion compensation image) by reading a reference block from the reference picture memory 306 based on the inter prediction parameters (predFlagLX, refIdxLX, and mvLX) input from the inter prediction parameter derivation unit 303. The reference block is a block located on the reference picture RefPicLX indicated by refIdxLX, at a position shifted by mvLX from the position of the target block. Here, in a case that mvLX does not have an integer precision, an interpolation image is generated by using a filter referred to as a motion compensation filter for generating pixels at the fractional positions.

The motion compensation unit 3091 first derives an integer position (xInt, yInt) and a phase (xFrac, yFrac) corresponding to in-prediction block coordinates (x, y) by the following equations.

$$xInt = xPb + (mvLX[0] \gg (\log 2(MVPREC))) + x$$

$$xFrac = mvLX[0] \,\&(MVPREC - 1)$$

$$yInt = yPb + (mvLX[1] \gg (\log 2(MVPREC))) + y$$

$$yFrac = mvLX[1] \,\&(MVPREC - 1)$$

Here, (xPb, yPb) indicates the top left coordinates of a block with a bW*bH size, that is, x=0, . . . , bW−1, y=0, . . . , bH−1, and MVPREC indicates the precision of mvLX (1/MVPREC pixel precision). For example, MVPREC=16.

The motion compensation unit 3091 derives a temporary image temp[ ][ ] by performing a horizontal interpolation on a reference picture refImg by using an interpolation filter. In the equation below, Σ is the sum related to k of k=0, . . . , NTAP−1, shift1 is a normalization parameter for adjusting a value range, and offset1=1<<(shift1−1).

$$temp[x][y] = \left(\sum mcFilter[xFrac][k] * refImg[xInt + k - NTAP/2 + 1][yInt] + \text{offset1}\right) \gg \text{shift1}$$

Subsequently, the motion compensation unit 3091 derives an interpolation image Pred[ ][ ] by performing vertical interpolation processing on the temporary image temp[ ][ ]. In the equation below, X is the sum related to k of k=0, . . . , NTAP−1, shift2 is a normalization parameter for adjusting a value range, and offset2=1<<(shift2−1).

$$Pred[x][y] = \left(\sum mcFilter[yFrac][k] * temp[x]\left[y + k - NTAP/2 + 1\right] + \text{offset2}\right) \gg \text{shift2}$$

Note that, in a case of bi-prediction, Pred[ ][ ] described above is used to derive interpolation images PredL0[ ][ ] and PredL1[ ][ ] for each of the L0 list and the L1 list, and an interpolation image Pred[ ][ ] is generated from PredL0[ ][ ] and PredL1[ ][ ].

GPM Combining Processing

In a case that ciip_mode is 0, the GPM combining unit 30952 generates a prediction image of the GPM mode, using a weighted sum of multiple inter prediction images.

IntraInter Combining Processing

In a case that ciip_mode is 1, the IntraInter combining unit 30951 generates a prediction image, a prediction image of the CIP mode, using a weighted sum of an inter prediction image and an intra prediction image.

BIO Prediction

In a bi-prediction mode, the BIO unit 30954 generates a prediction image with reference to two prediction images (first prediction image and second prediction image) and a gradient correction term.

Weighted Prediction

The weighted prediction unit 3094 generates a prediction image of a block by multiplying an interpolation image PredLX by a weight coefficient.

The inter prediction image generation unit 309 outputs the generated prediction image of the block to the addition unit 312.

Configuration of Video Coding Apparatus

Figure 16:
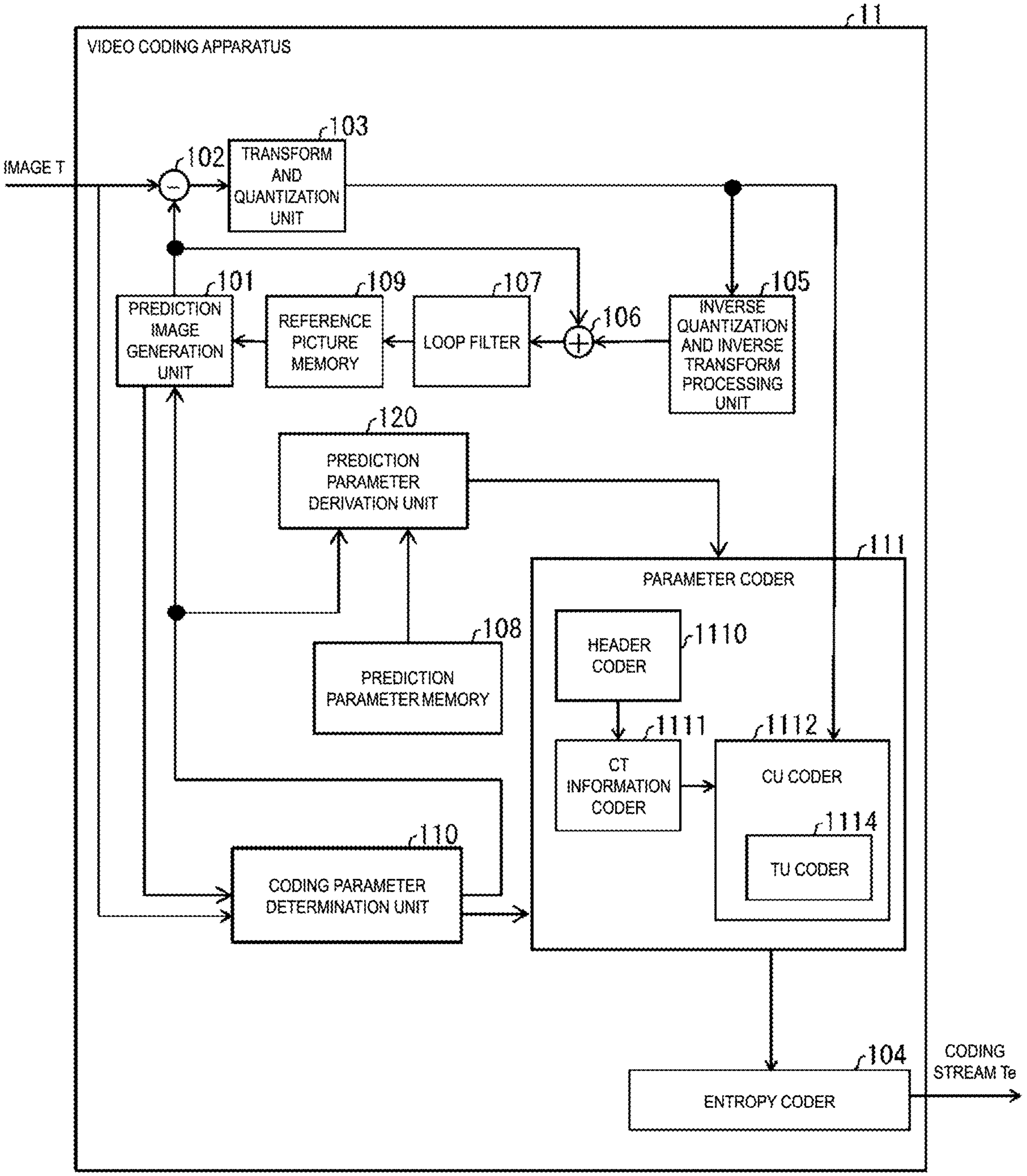
FIG. 16 is a block diagram illustrating a configuration of the video coding apparatus.

Next, a configuration of the video coding apparatus 11 according to the present embodiment will be described. FIG. 16 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit already described, and description of these units is omitted.

The subtraction unit 102 subtracts a pixel value of the prediction image of a block input from the prediction image generation unit 101 from a pixel value of an image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The transform and quantization unit 103 includes a separable transform processing unit (first transform processing unit), a non-separable transform processing unit (second transform processing unit), and a scaling unit.

The separable transform processing unit applies the separable transform to a prediction error. The scaling unit performs scaling for a transform coefficient by using a quantization matrix.

The inverse quantization and inverse transform processing unit 105 is the same as the inverse quantization and inverse transform processing unit 311 of the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantized transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supply, to the parameter coder 111, syntax elements such as the inter prediction parameters (predMode, general_merge_flag, merge_idx, inter_pred_idc, refIdxLX, mvp_LX_idx, and mvdLX), the intra prediction parameters, and the quantized transform coefficients.

The parameter coder 111 inputs the quantized transform coefficients and the coding parameters (split information and prediction parameters) to the entropy coder 104. The entropy coder 104 performs entropy-coding of the quantized transform coefficients and the coding parameters to generate and output a coding stream Te.

The prediction parameter derivation unit 120 is a means including the inter prediction parameter coder 112 and the intra prediction parameter coder, and derives an intra prediction parameter and an inter prediction parameter from the parameters input from the coding parameter determination unit 110. The derived intra prediction parameter and inter prediction parameter are output to the parameter coder 111.

Configuration of Inter Prediction Parameter Coder

Figure 17:
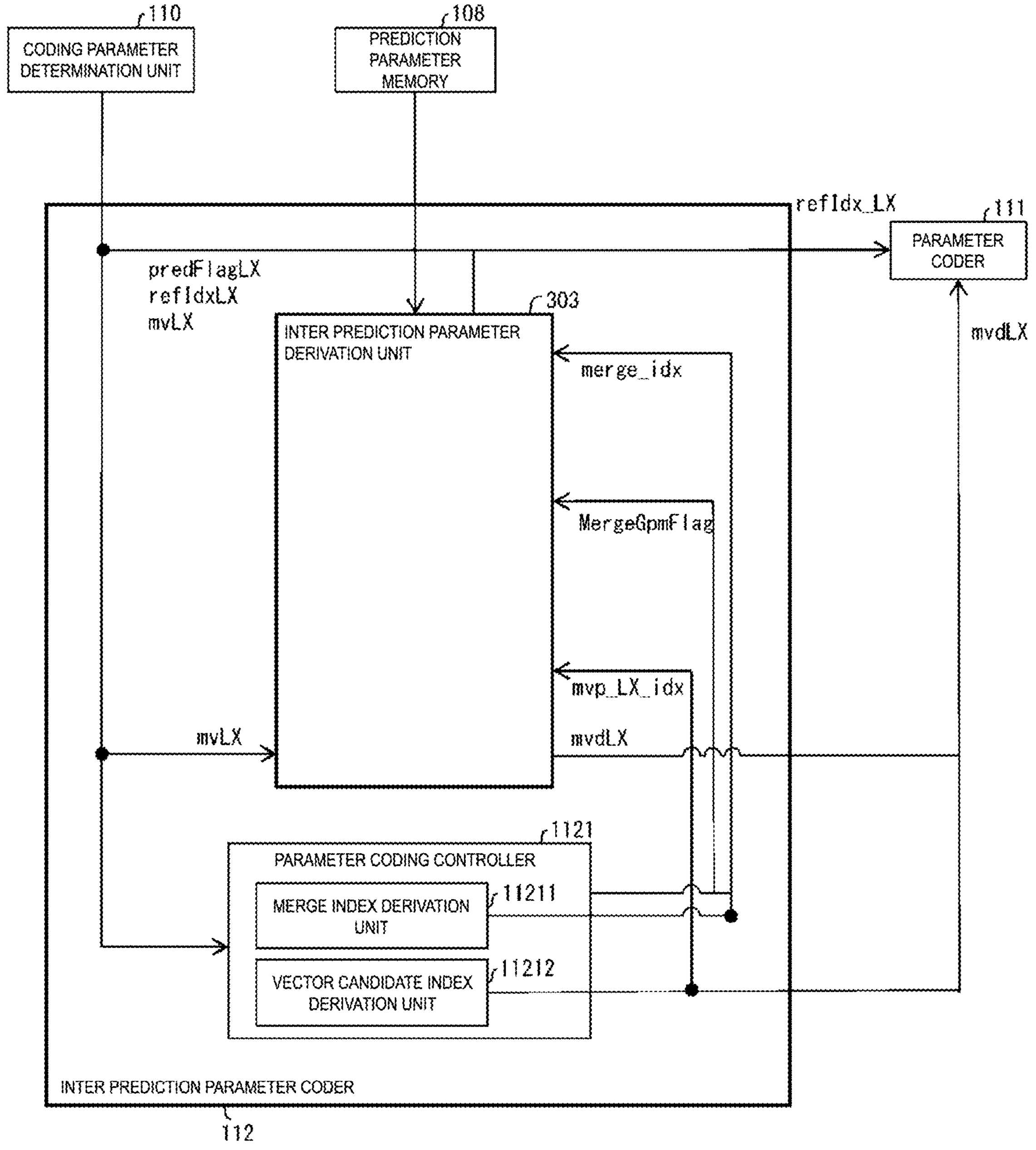
FIG. 17 is a schematic diagram illustrating a configuration of an inter prediction parameter coder.

The inter prediction parameter coder 112 includes a parameter coding controller 1121 and an inter prediction parameter derivation unit 303 as illustrated in FIG. 17. The inter prediction parameter derivation unit 303 has a configuration common to the video decoding apparatus. The parameter coding controller 1121 includes a merge index derivation unit 11211 and a vector candidate index derivation unit 11212.

The merge index derivation unit 11211 derives merge candidates and the like, and outputs the merge candidates and the like to the inter prediction parameter derivation unit 303. The vector candidate index derivation unit 11212 derives prediction vector candidates and the like, and outputs the prediction vector candidates and the like to the inter prediction parameter derivation unit 303 and the parameter coder 111.

Configuration of Intra Prediction Parameter Coder

The intra prediction parameter coder includes a parameter coding controller and an intra prediction parameter derivation unit. The intra prediction parameter derivation unit has a configuration common to the video decoding apparatus.

However, unlike in the video decoding apparatus, the inter prediction parameter derivation unit 303 and the intra prediction parameter derivation unit are input from the coding parameter determination unit 110 and the prediction parameter memory 108, and perform output to the parameter coder 111.

The addition unit 106 adds, for each pixel, the pixel value for the prediction block input from the prediction image generation unit 101 and the prediction error input from the inverse quantization and inverse transform processing unit 105 to generate a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may include only a deblocking filter, for example.

The prediction parameter memory 108 stores the prediction parameters generated by the coding parameter determination unit 110 at a predetermined position for each target picture and CU.

The reference picture memory 109 stores the decoded image generated by the loop filter 107 at a predetermined position for each target picture and CU.

The coding parameter determination unit 110 selects one set among multiple sets of coding parameters. The coding parameters include QT, BT, or TT split information described above, a prediction parameter, or a parameter to be coded which is generated in relation to the aforementioned elements. The prediction image generation unit 101 generates a prediction image by using these coding parameters.

The coding parameter determination unit 110 calculates an RD cost value indicating the magnitude of an amount of information and a coding error for each of the multiple sets. The RD cost value is, for example, the sum of an amount of code and the value obtained by multiplying a square error by a coefficient k. The code amount is an amount of information of the coding stream Te obtained by performing entropy coding on a quantization error and a coding parameter. The square error is the square sum of prediction errors calculated by the subtraction unit 102. The coefficient k is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Note that a computer may be used to implement one or some constituent elements included in the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, the parameter coder 111, and the prediction parameter derivation unit 120. In that case, this configuration may be implemented by recording a program for achieving such control functions on a computer-readable recording medium and causing a computer system to read and perform the program recorded on the recording medium. Note that the "computer system" described here refers to a computer system built into either the video coding apparatus 11 or the video decoding apparatus 31 and is assumed to include an OS and hardware components such as a peripheral apparatus. In addition, the "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. In addition, the above-described program may be a program for implementing one or some of the above-described functions, and also may be a program capable of achieving the above-described functions in combination with a program already recorded in a computer system.

One or some, or all of the video coding apparatus 11 and the video decoding apparatus 31 in the embodiment described above may be implemented as an integrated circuit such as a Large Scale Integration (LSI). Each function block of the video coding apparatus 11 and the video decoding apparatus 31 may be individually implemented as processors, or one or some, or all may be integrated into a processor. In addition, the circuit integration technique is not limited to LSI, and implementation as a dedicated circuit or a multi-purpose processor may be adopted. In addition, in a case that a circuit integration technology that replaces LSI appears as the semiconductor technologies advance, an integrated circuit based on that technology may be used.

Although embodiments of the present invention have been described above in detail with reference to the drawings, the specific configurations thereof are not limited to those described above and various design changes or the like can be made without departing from the spirit of the invention.

An embodiment of the present invention is not limited to the embodiments described above and various changes can be made within the scope indicated by the claims. That is, embodiments obtained by combining technical means appropriately modified within the scope indicated by the claims are also included in the technical scope of the present invention.

INDUSTRIAL APPLICABILITY

The embodiments of the present invention can be preferably applied to a video decoding apparatus for decoding coded data in which image data is coded, and a video coding apparatus for generating coded data in which image data is coded. In addition, the embodiments of the present invention can be preferably applied to a data structure of coded data generated by the video coding apparatus and referred to by the video decoding apparatus.

REFERENCE SIGNS LIST

31 Video decoding apparatus
301 Entropy decoder
302 Parameter decoder
3022 CU decoder
3024 TU decoder
303 Inter prediction parameter derivation unit
30376 MMVD prediction unit
305, 107 Loop filter
306, 109 Reference picture memory
307, 108 Prediction parameter memory
308, 101 Prediction image generation unit
309 Inter prediction image generation unit
311, 105 Inverse quantization and inverse transform processing unit
312, 106 Addition unit
320 Prediction parameter derivation unit
11 Video coding apparatus
102 Subtraction unit
103 Transform and quantization unit
104 Entropy coder
110 Coding parameter determination unit
111 Parameter coder
112 Inter prediction parameter coder
120 Prediction parameter derivation unit

The invention claimed is:

1. A video decoding apparatus comprising:

a merge with motion vector difference (MMVD) prediction circuit configured to obtain a motion vector by adding a difference vector at a prescribed distance and in a prescribed direction to a predicted motion vector of a target block; and a parameter decoding circuit configured to decode, from coded data, an index for indicating a difference vector from an MMVD candidate list, wherein the MMVD prediction circuit derives the difference vector at a specific distance and in a specific direction from the prescribed distance and the prescribed direction, performs a search by deriving a template matching cost for the difference vector, and derives the MMVD candidate list by inserting a difference vector candidate according to the template matching cost, and in the search, only a subset (DIR1) corresponding to a first direction is searched at the prescribed distance, and only a subset (DIR2) corresponding to a second direction is searched at a distance other than the prescribed distance.

2. The video decoding apparatus according to claim 1, wherein the subset (DIR1) corresponding to the first direction includes eight directions that include horizontal directions, vertical directions, and diagonal 45-degree directions.

3. The video decoding apparatus according to claim 1, wherein the subset (DIR2) corresponding to the second direction includes a total of three directions that include a direction and directions adjacent to the direction, the direction giving a minimum cost among a plurality of template matching costs, including the template matching cost, corresponding to a number of searches, obtained at an immediately previous distance.

4. The video decoding apparatus according to claim 1, wherein the subset (DIR2) corresponding to the second direction includes up to six directions that include two directions and directions adjacent to each of the two directions, the two directions giving a minimum cost among a plurality of template matching costs, including the template matching cost, corresponding to a number of searches, obtained at an immediately previous distance.

5. The video decoding apparatus according to claim 1, wherein, in the search, a direction included in the subset (DIR2) corresponding to the second direction is searched for each distance candidate, and the direction included in the subset (DIR2) corresponding to the second direction is updated for each distance candidate.

6. A video decoding apparatus comprising:

a merge with motion vector difference (MMVD) prediction circuit configured to obtain a motion vector by adding a difference vector at a prescribed distance and in a prescribed direction to a predicted motion vector of a target block; and a parameter decoding circuit configured to decode, from coded data, an index for indicating a difference vector from an MMVD candidate list, wherein the MMVD prediction circuit derives the difference vector at a specific distance and in a specific direction from the prescribed distance and the prescribed direction, performs a search by deriving a template matching cost for the difference vector, and derives the MMVD candidate list by inserting a difference vector candidate according to the template matching cost, and in the search, only a subset (DIR1) corresponding to a first direction is searched at a distance included in a prescribed distance set, and only a subset (DIR2) corresponding to a second direction is searched at a distance included in a distance set other than the prescribed distance set.

7. The video decoding apparatus according to claim 6, wherein, in the search, a direction included in the subset (DIR2) corresponding to the second direction is searched for a distance set including a plurality of distance candidates, and the direction included in the subset (DIR2) corresponding to the second direction is updated for the distance set including the plurality of distance candidates.

8. The video decoding apparatus according to claim 7, wherein, in the search, a number of directions included in the subset (DIR2) corresponding to the second direction differs depending on the distance set.

* * * * *